US011877278B2

(12) United States Patent
Park et al.

(10) Patent No.: US 11,877,278 B2
(45) Date of Patent: Jan. 16, 2024

(54) SIDELINK DRX TIMER-BASED POWER-SAVING METHOD AND DEVICE OF POWER-SAVING TERMINAL IN NR V2X

(71) Applicant: LG ELECTRONICS INC., Seoul (KR)

(72) Inventors: Giwon Park, Seoul (KR); Seungmin Lee, Seoul (KR); Seoyoung Back, Seoul (KR); Jongwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/112,404

(22) Filed: Feb. 21, 2023

(65) Prior Publication Data

US 2023/0209535 A1  Jun. 29, 2023

Related U.S. Application Data

(63) Continuation of application No. PCT/KR2021/012226, filed on Sep. 8, 2021.
(Continued)

(30) Foreign Application Priority Data

Sep. 8, 2020 (KR) .................. 10-2020-0114776
Dec. 14, 2020 (KR) .................. 10-2020-0174131
Jan. 14, 2021 (KR) .................. 10-2021-0005592

(51) Int. Cl.
*H04W 24/10* (2009.01)
*H04W 72/1263* (2023.01)
*H04W 72/40* (2023.01)

(52) U.S. Cl.
CPC ....... *H04W 72/1263* (2013.01); *H04W 24/10* (2013.01); *H04W 72/40* (2023.01)

(58) Field of Classification Search
CPC .. H04W 72/1263; H04W 24/10; H04W 72/40
See application file for complete search history.

(56) References Cited

U.S. PATENT DOCUMENTS

| 2016/0021700 A1 | 1/2016 | Oh et al. |
| 2022/0295517 A1* | 9/2022 | Hahn ................. H04L 5/0044 |
| 2023/0014303 A1* | 1/2023 | Di Girolamo ........ H04W 72/20 |

FOREIGN PATENT DOCUMENTS

| WO | 2016167615 | 10/2016 |
| WO | 2018064477 | 4/2018 |

OTHER PUBLICATIONS

MediaTek Inc., "Misc. corrections CR for 36.331 for Power Savings," 3GPP TSG-RAN2 Meeting #111-e, online, R2-2008373, Sep. 2020, 1052 pages.

(Continued)

*Primary Examiner* — Chuong A Ngo
(74) *Attorney, Agent, or Firm* — LEE, HONG, DEGERMAN, KANG & WAIMEY

(57) ABSTRACT

Proposed is a method for operating a first device (100) in a wireless communication system. The method may comprise the steps of: starting a first timer related to an on-duration interval; transmitting first sidelink control information (SCI) for scheduling a first physical sidelink shared channel (PSSCH) and second SCI to a second device (200) through a physical sidelink control channel (PSCCH); transmitting the second SCI including information associated with a channel state information (CSI) request to the second device (200) through the first PSSCH; and receiving, from the second device (200), a medium access control (MAC) control element (CE) including a CSI report associated with the CSI request, on the basis of a second timer which is in operation.

15 Claims, 25 Drawing Sheets

Related U.S. Application Data

(60) Provisional application No. 63/105,200, filed on Oct. 23, 2020.

(56) References Cited

OTHER PUBLICATIONS

Huawei, HiSilicon, "Discussion on preferredDRX-ShortCycle Timer," 3GPP TSG-RAN WG2 Meeting #111, online, R2-2007815, Aug. 2020, 7 pages.
PCT International Application No. PCT/KR2021/012226, International Search Report dated Dec. 20, 2021, 4 pages.

* cited by examiner

SIDELINK DRX TIMER-BASED POWER-SAVING METHOD AND DEVICE OF POWER-SAVING TERMINAL IN NR V2X

CROSS-REFERENCE TO RELATED APPLICATION(S)

This application is a continuation of International Application No. PCT/KR2021/012226 filed on Sep. 8, 2021, which claims the benefit of earlier filing date and right of priority to Korean Patent Application Nos. 10-2020-0114776, filed on Sep. 8, 2020, 10-2020-0174131, filed on Dec. 14, 2020, and 10-2021-0005592, filed on Jan. 14, 2021, and also claims the benefit of U.S. Provisional Application No. 63/105,200, filed on Oct. 23, 2020, the contents of which are all hereby incorporated by reference herein in their entireties.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY

In one embodiment, a method of operating the first device 100 in a wireless communication system is proposed. The method may comprise: starting a first timer related to an on-duration period; transmitting, to a second device, first sidelink control information (SCI) for scheduling of a first physical sidelink shared channel (PSSCH) and second SCI, through a physical sidelink control channel (PSCCH); transmitting, to the second device, the second SCI including information related to a channel state information (CSI) request through the first PSSCH; and receiving, from the second device, a medium access control (MAC) control element (CE) including a CSI report related to the CSI request, based on a second timer running.

The user equipment (UE) can efficiently perform SL communication.

DETAILED DESCRIPTION

Figure 1:
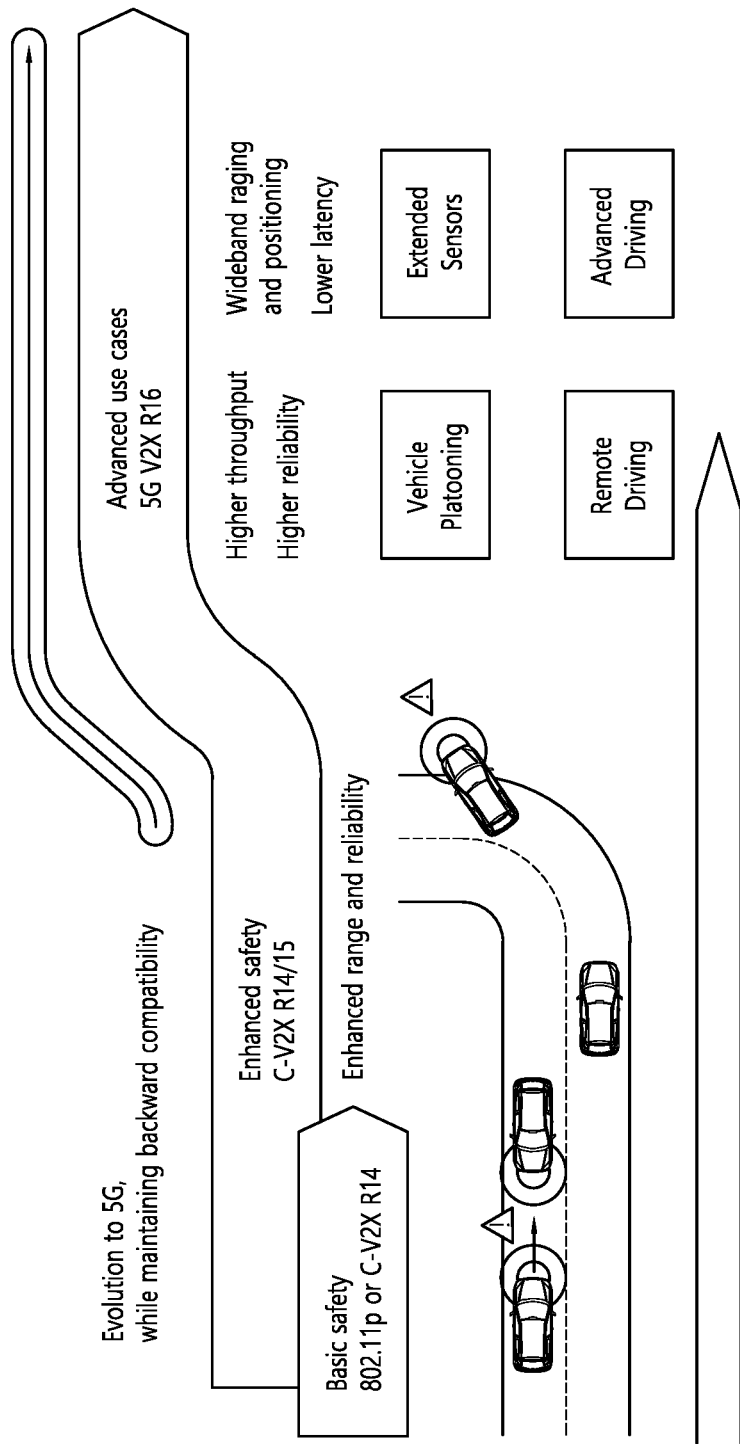
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
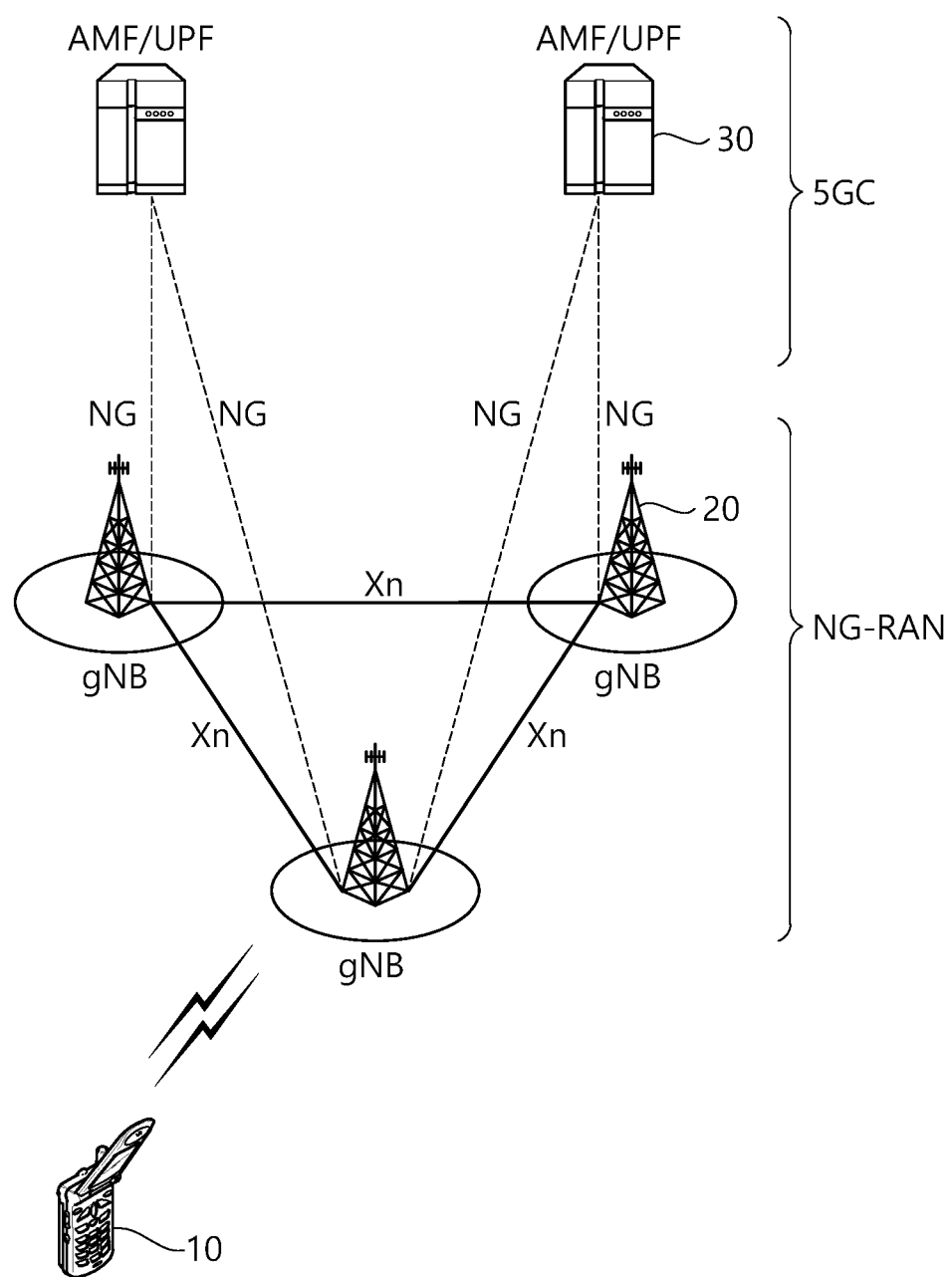
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
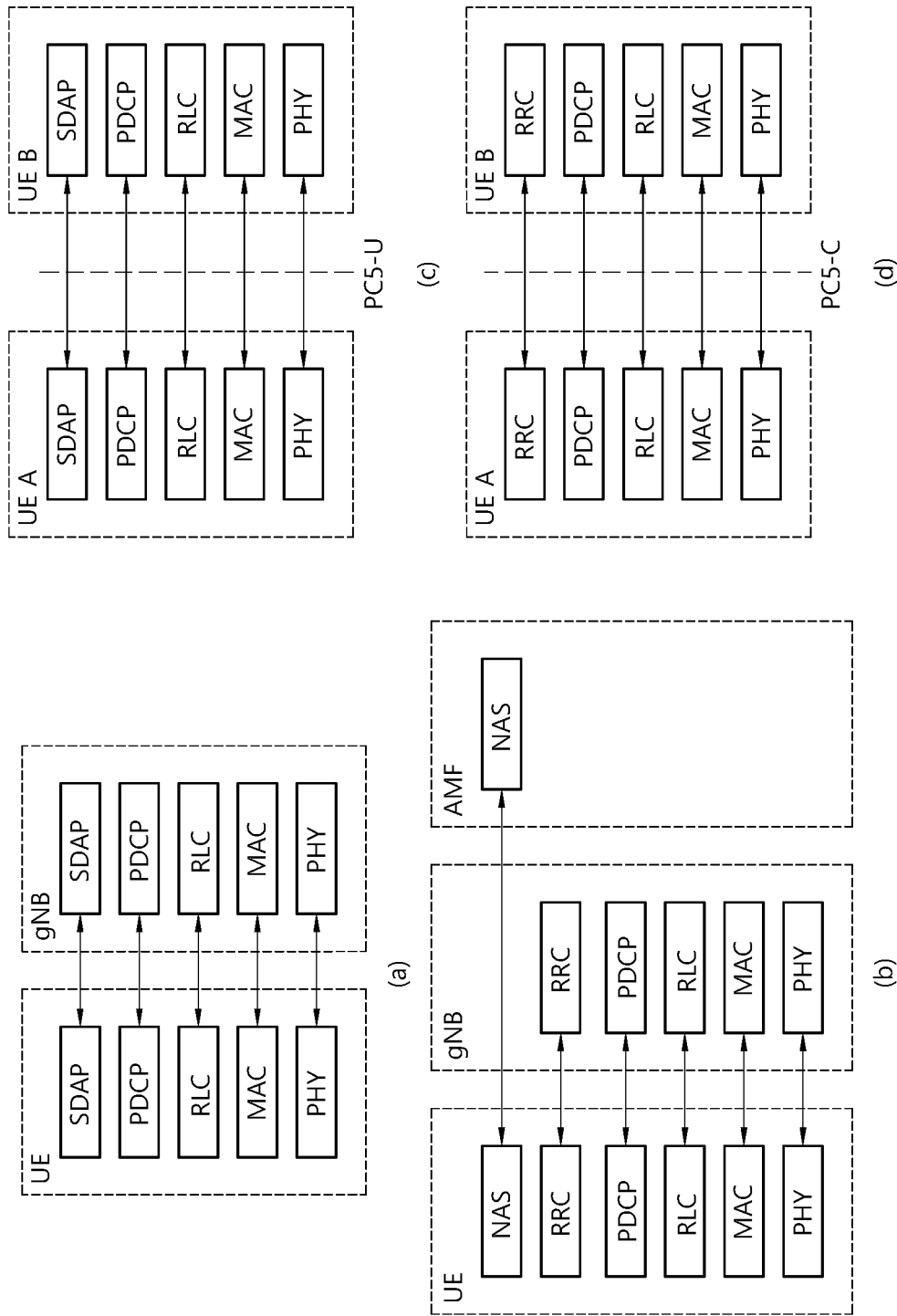
FIG. 3 shows a radio protocol architecture, based on an embodiment of the present disclosure.

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
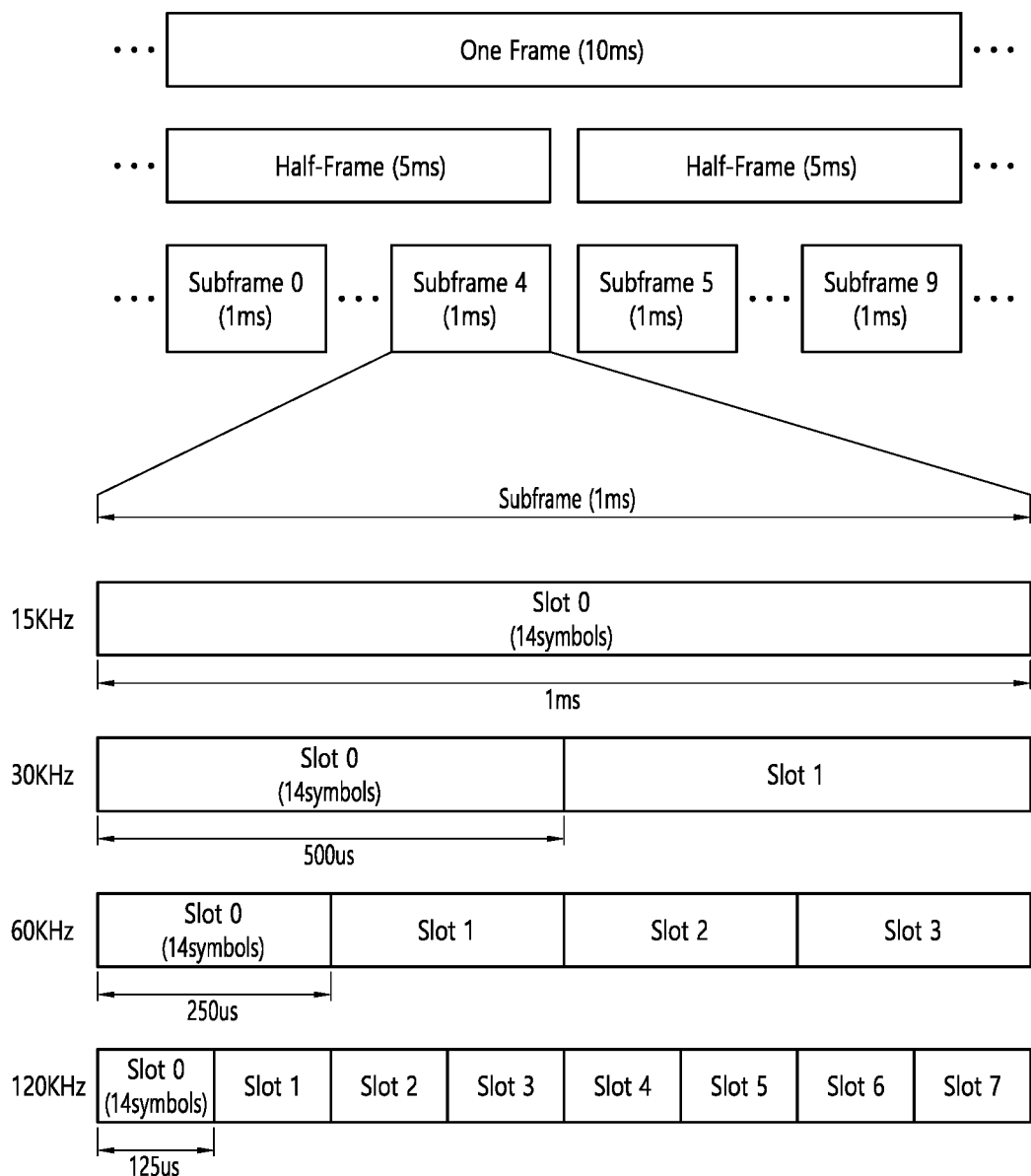
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15*$2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
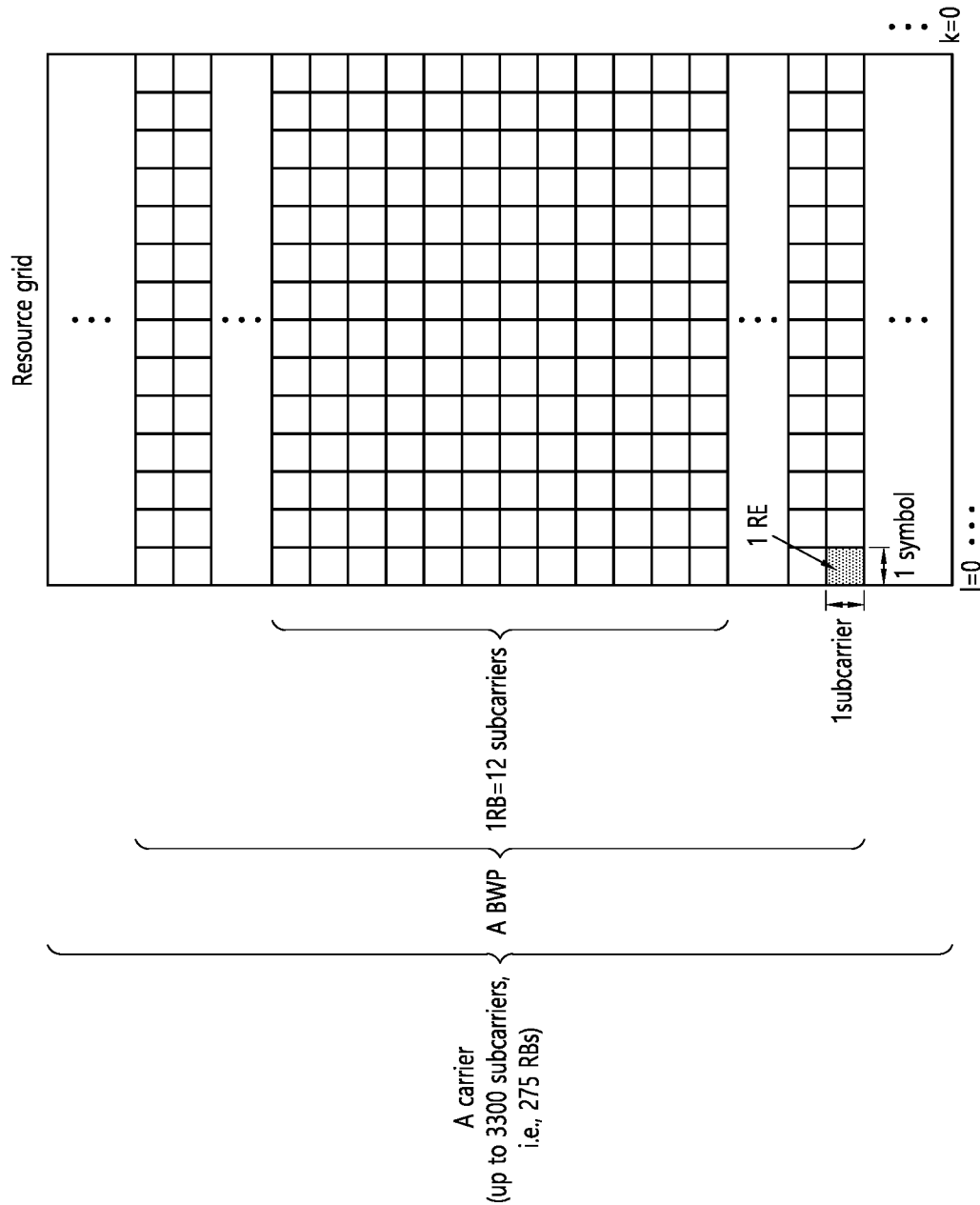
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
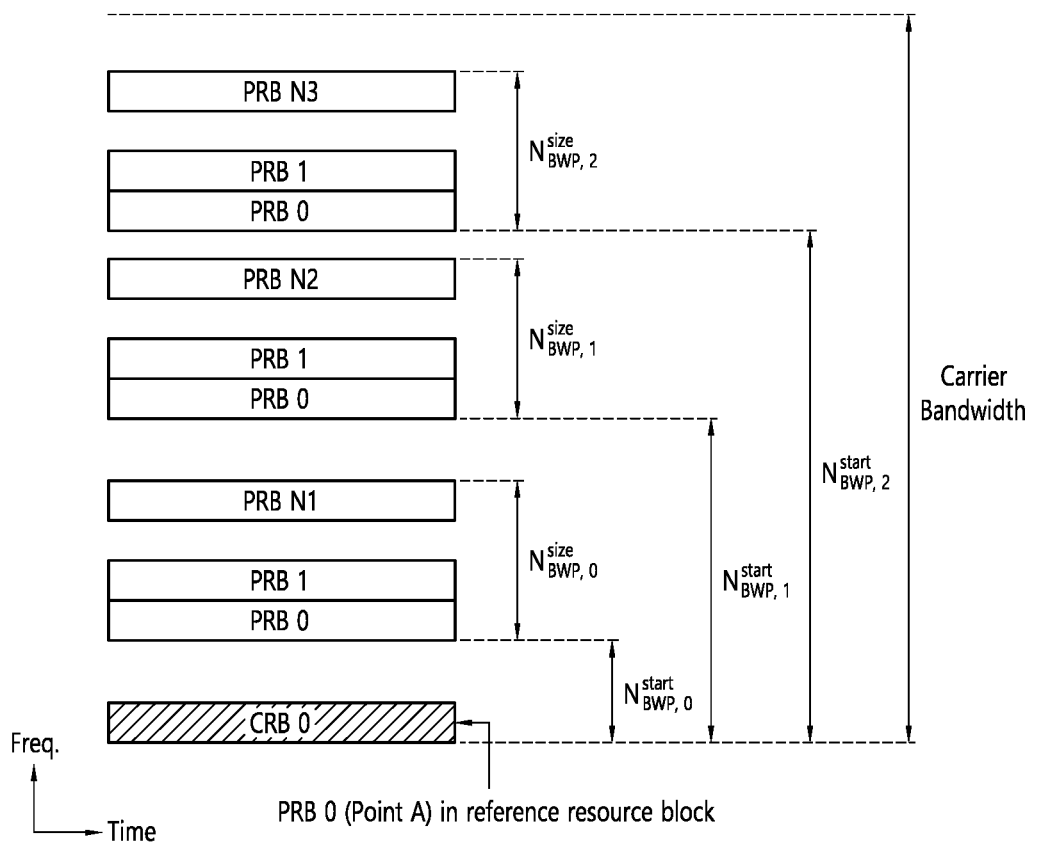
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
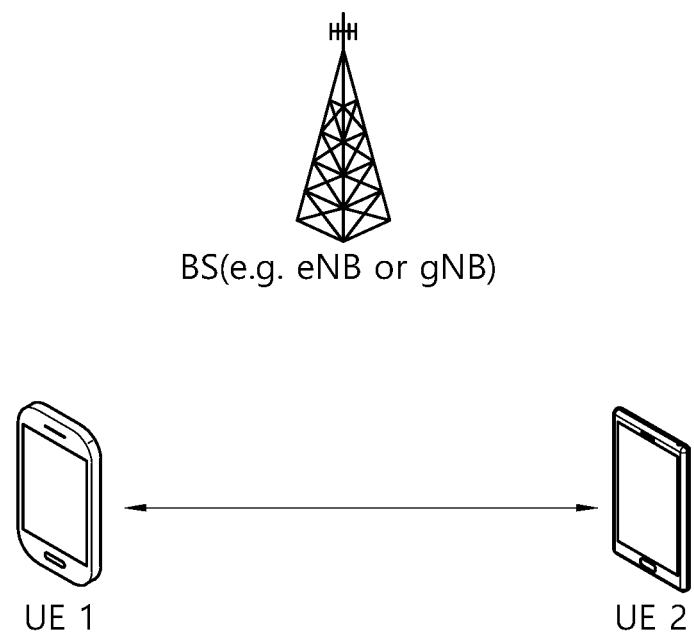
FIG. 7 shows a UE performing V2X or SL communication, based on an embodiment of the present disclosure.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
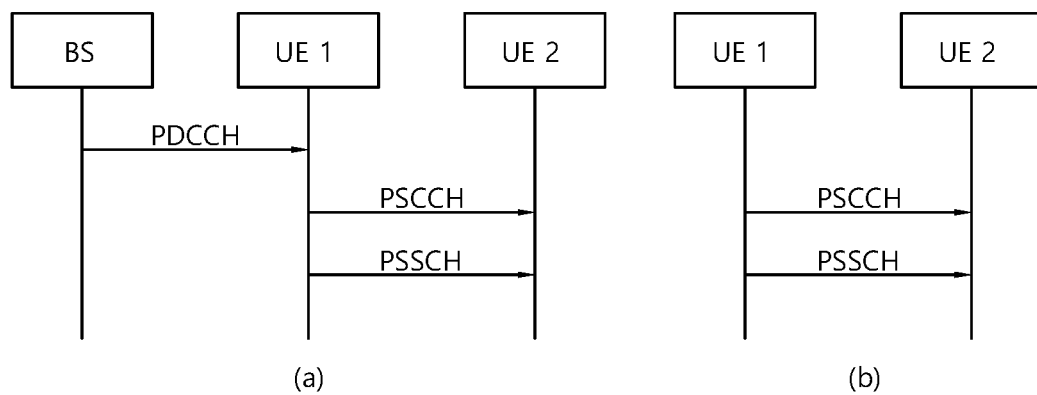
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
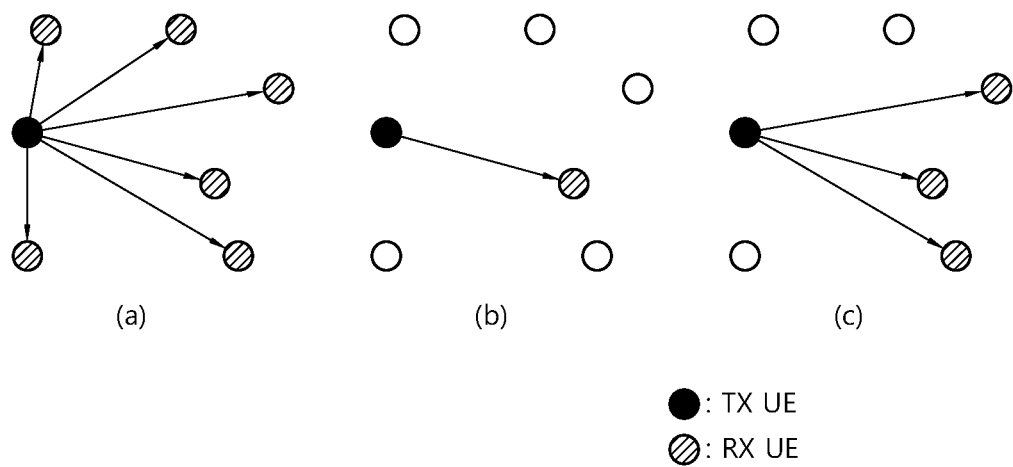
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like. Hereinafter, a sidelink control information (SCI) will be described.

Control information transmitted by a BS to a UE through a PDCCH may be referred to as downlink control information (DCI), whereas control information transmitted by the UE to another UE through a PSCCH may be referred to as SCI. For example, the UE may know in advance a start symbol of the PSCCH and/or the number of symbols of the PSCCH, before decoding the PSCCH. For example, the SCI may include SL scheduling information. For example, the UE may transmit at least one SCI to another UE to schedule the PSSCH. For example, one or more SCI formats may be defined.

For example, a transmitting UE may transmit the SCI to a receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, if SCI configuration fields are divided into two groups in consideration of a (relatively) high SCI payload size, an SCI including a first SCI configuration field group may be referred to as a first SCI or a $1^{st}$ SCI, and an SCI including a second SCI configuration field group may be referred to as a second SCI or a $2^{nd}$ SCI. For example, the transmitting UE may transmit the first SCI to the receiving UE through the PSCCH. For example, the transmitting UE may transmit the second SCI to the receiving UE on the PSCCH and/or the PSSCH. For example, the second SCI may be transmitted to the receiving UE through an (independent) PSCCH, or may be transmitted in a piggyback manner together with data through the PSSCH. For example, two consecutive SCIs may also be applied to different transmissions (e.g., unicast, broadcast, or groupcast).

For example, the transmitting UE may transmit the entirety or part of information described below to the receiving UE through the SCI. Herein, for example, the transmitting UE may transmit the entirety or part of the information described below to the receiving UE through the first SCI and/or the second SCI.

PSSCH and/or PSCCH related resource allocation information, e.g., the number/positions of time/frequency resources, resource reservation information (e.g., period), and/or SL CSI report request indicator or SL (L1) RSRP (and/or SL (L1) RSRQ and/or SL (L1) RSSI) report request indicator, and/or SL CSI transmission indicator (or SL (L1) RSRP (and/or SL (L1) RSRQ and/or SL (L1) RSSI) information transmission indicator)) (on PSSCH), and/or MCS information, and/or Transmit power information, and/or L1 destination ID information and/or L1 source ID information, and/or SL HARQ process ID information, and/or New data indicator (NDI) information, and/or Redundancy version (RV) information, and/or (Transmission traffic/packet related) QoS information, e.g., priority information, and/or SL CSI-RS transmission indicator or information on the number of (to-be-transmitted) SL CSI-RS antenna ports, and/or Location information of a transmitting UE or location (or distance region) information of a target receiving UE (for which SL HARQ feedback is requested), and/or Reference signal (e.g., DMRS, etc.) related to channel estimation and/or decoding of data to be transmitted through a PSSCH, e.g., information related to a pattern of a (time-frequency) mapping resource of DMRS, rank information, antenna port index information For example, the first SCI may include information related to channel sensing. For example, the receiving UE may decode the second SCI by using a PSSCH DMRS. A polar code used in a PDCCH may be applied to the second SCI. For example, in a resource pool, a payload size of the first SCI may be identical for unicast, groupcast, and broadcast. After decoding the first SCI, the receiving UE does not have to perform blind decoding of the second SCI. For example, the first SCI may include scheduling information of the second SCI.

Meanwhile, in various embodiments of the present disclosure, since a transmitting UE may transmit at least one of a SCI, a first SCI, and/or a second SCI to a receiving UE through a PSCCH, the PSCCH may be replaced/substituted with at least one of the SCI, the first SCI and/or the second SCI. Additionally/alternatively, for example, the SCI may be replaced/substituted with at least one of the PSCCH, the first SCI, and/or the second SCI. Additionally/alternatively, for example, since a transmitting UE may transmit a second SCI to a receiving UE through a PSSCH, the PSSCH may be replaced/substituted with the second SCI.

Hereinafter, SL measurement and reporting will be described.

SL measurement and reporting (e.g., RSRP, RSRQ) between UEs may be considered in SL, for the purpose of QoS prediction, initial transmission parameter setting, link adaptation, link management, admission control, etc. For example, a receiving UE may receive a reference signal from a transmitting UE, and the receiving UE may measure a channel state of the transmitting UE based on the reference signal. And, a receiving UE may report channel state information (CSI) to a transmitting UE. SL-related measurement and reporting may include measurement and reporting of CBR and reporting of location information. Examples of Channel Status Information (CSI) for V2X may be Channel Quality Indicator (CQI), Precoding Matrix Index (PMI), Rank Indicator (RI), Reference Signal Received Power (RSRP), Reference Signal Received Quality (RSRQ), path-gain/pathloss, SRI (SRS, Sounding Reference Symbols, Resource Indicator), CSI-RS Resource Indicator (CRI), interference condition, vehicle motion, etc. In the case of unicast communication, CQI, RI and PMI or some of them may be supported in a non-subband-based aperiodic CSI report assuming four or less antenna ports. CSI procedures may not depend on standalone RS. CSI reporting can be activated and deactivated according to configurations.

For example, a transmitting UE may transmit a CSI-RS to a receiving UE, and the receiving UE may measure CQI or RI using the CSI-RS. For example, the CSI-RS may be referred to as an SL CSI-RS. For example, the CSI-RS may be confined within PSSCH transmission. For example, a transmitting UE may transmit a CSI-RS to a receiving UE by including a CSI-RS on a PSSCH resource.

On the other hand, NR V2X of Release 16 did not support a power saving operation of a UE, and from NR V2X of Release 17, a power saving operation of a UE will be supported.

In Uu DRX operation according to the prior art, by defining drx-InactivityTimer, when a UE receives a new transport block (TB) from a base station or transmits a new TB to a base station, even if a DRX on-duration period expires, by starting the drx-InactivityTimer, the DRX on-duration period is extended while the drx-InactivityTimer expires, therefore, communication between the UE and the base station is continuously guaranteed by remaining in an active state without transitioning to a sleep state.

According to an embodiment of the present disclosure, a sidelink (SL) drx-InactivityTimer is defined and a new condition for starting the SL drx-InactivityTimer is also defined, and a method of operating In NR V2X so that a UE can continue to guarantee SL transmission by extending an active state without transitioning to a sleep state is proposed. The SL drx-InactivityTimer proposed in this disclosure may be a timer defined to support the SL operation (e.g., sidelink transmission or sidelink reception) of a UE, and, for example, may be a timer defined for the purpose of extending an on-duration or active time for a UE to transmit or receive a sidelink signal. Alternatively, the SL drx-InactivityTimer proposed in this disclosure may be a timer defined to support an SL operation of a UE. That is, it may be a timer defined for the purpose of extending an on-duration or active time for a UE to monitor (or receive) a signal of a base station. Alternatively, for example, in the following description, 'when, if, or in case of' may be replaced with 'based on'.

Hereinafter, an operation method related to an SL drx-InactivityTimer, an SL DRX active timer, and/or an SL DRX timer in which a UE in SL DRX operation operates as an active time of the UE is proposed. For example, when an SL DRX timer of the present disclosure is running, a UE may operate in active time. For example, when an SL DRX timer of the present disclosure is running, a UE may operate in active time regardless of on-duration or off-duration. For example, an SL DRX timer of the present disclosure may include SL drx-InactivityTimer, SL DRX active timer, SL DRX-RetransmissionTimer, and/or SL DRX HARQ RTT timer. For example, even if the SL drx-InactivityTimer is taken as an example in the embodiment of the present disclosure, this may mean all timers included in the SL DRX timer.

According to an embodiment of the present disclosure, a method for a UE to perform a power saving operation based on a sidelink DRX configuration shown in Table 5 below is proposed. Specifically, a method of operating an SL drx-InactivityTimer and/or an SL DRX timer that can be applied to extend or complete an on-duration period of SL DRX or to allow a UE to operate in active time in SL DRX is proposed.

Table 5 shows a description of terms related to sidelink DRX configuration.

TABLE 5

- Sidelink DRX configurations
- ✓ SL drx-onDurationTimer: the duration at the beginning of a DRX Cycle;
- ✓ SL drx-SlotOffset: the delay before starting the drx-onDurationTimer;
- ✓ SL drx-InactivityTimer: the duration after the PSCCH occasion in which a PSCCH indicates a new SL transmission for the MAC entity;
- ✓ SL drx-RetransmissionTimer (per HARQ process or per Sidelink process): the maximum duration until a retransmission is received;
- ✓ SL drx-LongCycleStartOffset: the Long DRX cycle and drx-StartOffset which defines the subframe where the Long and Short DRX Cycle starts;
- ✓ SL drx-ShortCycle (optional): the Short DRX cycle;
- ✓ SL drx-ShortCycleTimer (optional): the duration the UE shall follow the Short DRX cycle;
- ✓ SL drx-HARQ-RTT-Timer (per HARQ process or per Sidelink process): the minimum duration before a assignment for HARQ retransmission is expected by the MAC entity.

According to an embodiment of the present disclosure, when at least one of the following conditions is satisfied, a transmitting UE may start an SL drx-InactivityTimer. While the SL drx-InactivityTimer is running, a UE may continue to perform SL communication by maintaining an active state. The SL drx-InactivityTimer operated by a transmitting UE may be a timer operated for the purpose of synchronizing with an SL drx-InactivityTimer operated by a receiving UE for an SL DRX operation of the receiving UE. That is, a transmitting UE may consider that a receiving UE has (re)started or stopped an SL drx InactivityTimer if the following conditions are satisfied.

1. When a transmitting UE transmits a PSCCH ($1^{st}$ SCI) and/or PSSCH ($2^{nd}$ SCI) related to PSSCH (SL data) to a receiving UE.

2. When a transmitting UE transmits a new TB to a receiving UE (PSSCH transmission: SL data).

3. When corresponding HARQ feedback (ACK/NACK or NACK) for PSSCH transmission is received from a receiving UE (PSFCH reception). In addition, a transmitting UE may stop an SL drx-InactivityTimer when receiving SL HARQ NACK from a receiving UE as much as the maximum threshold value.

4. When a transmitting UE receives corresponding HARQ feedback (HARQ ACK and/or HARQ NACK) for PSSCH transmission from a receiving UE and transmits SL HARQ feedback to a base station through PUCCH. In addition, in order to indicate to a base station that retransmission resources are no longer needed because SL HARQ NACK has been received from a receiving UE for the maximum threshold value, when a transmitting UE transmits SL HARQ ACK through a PUCCH, the transmitting UE may stop an SL drx-InactivityTimer.

5. When a transmitting UE does not receive corresponding HARQ feedback (ACK or NACK) for PSCCH/PSSCH transmission from a receiving UE (SL HARQ DTX detection). In addition, a transmitting UE may stop an SL drx-InactivityTimer when SL HARQ DTX occurs as much as the maximum threshold value (SL RLF occurs).

6. When SL HARQ DTX is reported from the physical layer to the MAC layer because a transmitting UE did not receive the corresponding HARQ feedback (ACK or NACK) for PSCCH/PSSCH transmission from a receiving UE (SL HARQ DTX detection).

7. When PSFCH monitoring is not performed due to a half duplex problem (a problem caused by a UE not being able to transmit and receive at the same time) when the transmitting UE transmits the PSCCH/PSSCH to the receiving UE (if there was no half duplex problem, the transmitting UE may have received the SL HARQ feedback transmitted by a receiving UE by monitoring a PSFCH, so the SL drx-InactivityTimer may need to be started).

8. When SL buffer status report (BSR) for sidelink transmission is triggered.

9. When SL BSR for sidelink transmission is triggered and scheduling request (SR) (via PUCCH) is pending.

10. When SR (via PUCCH) for sidelink transmission is transmitted to a base station.

11. When a transmitting UE transmits an SL BSR for sidelink transmission (via PUCCH or PUSCH) to a base station.

12. When a transmitting UE transmits an SL MAC CE (e.g., SL CSI report MAC CE) to a receiving UE.

13. When an SL CSI report MAC CE to be transmitted from a transmitting UE to a receiving UE is triggered.

14. When a transmitting UE transmits UL MAC CE (e.g., SL Configured Grant Confirmation MAC CE) to a base station.

15. When a transmitting UE receives an instruction to activate SL Configured Grant Type 2 (via PDCCH, i.e. DCI) from a base station.

16. When UL BSR for uplink transmission is triggered.

17. When a UL BSR for uplink transmission is triggered and a SR (via PUCCH) is pending.

According to an embodiment of the present disclosure, Cases 8 and 9 may be similarly applied to Uu connection. For example, Uu DRX InactivityTimer may be started even when BSR for Uu transmission is triggered. For example, when Uu BSR is triggered and a scheduling request is pending, Uu DRX InactivityTimer may be started.

According to an embodiment of the present disclosure, a method of allowing a receiving UE to start an SL drx-InactivityTimer when at least one of the following conditions is satisfied is proposed. While an SL drx-InactivityTimer is running, a UE may maintain an active state and continue to perform SL communication (SL transmission and/or SL reception).

1. When a receiving UE receives sidelink control information (SCI) ($1^{st}$ SCI and/or $2^{nd}$ SCI) transmitted by a transmitting UE.

2. When a receiving UE receives a new TB (SL data) transmitted by a transmitting UE (PSSCH reception).

3. When a receiving UE transmits corresponding HARQ feedback (ACK/NACK or NACK) for reception of a PSSCH (SL data) transmitted by a transmitting UE to the transmitting UE (PSFCH transmission), the receiving UE may start a timer. In addition, when a receiving UE transmits SL HARQ NACK to a transmitting UE as much as the maximum threshold value, the receiving UE may stop the SL drx-InactivityTimer and transition to a sleep state.

4. When only decoding of a PSCCH transmitted by a transmitting UE succeeds (PSSCH decoding fails), or, for example, when SL HARQ feedback (SL HARQ ACK and/or SL HARQ NACK) cannot be transmitted for the following reasons even though decoding of both PSCCH and PSSCH is successful, SL drx-InactivityTimer may be started to receive retransmission SL data transmitted by the transmitting UE. Alternatively, for example, a receiving UE may receive a retransmission packet transmitted by a transmitting UE by remaining in an SL active time.

4-1. When a receiving UE has SL data (e.g., SL HARQ feedback) to be transmitted to other UE, and UL data to be transmitted to a base station occurs at the same time, the receiving UE may perform prioritization for SL data and UL data and transmit data with a higher priority first. For example, if the priority of UL data is high in prioritization, a problem may occur in that the receiving UE cannot transmit SL HARQ feedback to the transmitting UE and transmits the UL data to the base station.

4-2. When a receiving UE has NR SL data (e.g., SL HARQ feedback) to be transmitted to other UE and also has LTE SL data at the same time, the receiving UE may perform prioritization for NR SL data and LTE SL data and transmit data having a higher priority first. For example, if the priority of LTE SL data is high in prioritization, a problem of not transmitting SL HARQ feedback to the transmitting UE may occur.

According to an embodiment of the present disclosure, a method of starting an SL drx-InactivityTimer by a receiving UE when at least one of the following conditions is satisfied when the receiving UE receives SCI transmitted by a transmitting UE is proposed. For example, the SCI may include a Layer 1 ID. While an SL drx-InactivityTimer is running, a UE can maintain an active state and continue to perform SL communication (SL transmission and/or SL reception).

Method 1. (In case of unicast, groupcast, and/or broadcast) a receiving UE may start an SL drx-InactivityTimer when receiving SCI transmitted by a transmitting UE.

Method 2. A receiving UE may receive SCI transmitted by a transmitting UE. For example, in the case of unicast transmission, when the receiving UE receives the SCI transmitted by the transmitting UE, the receiving UE may start an SL drx-InactivityTimer only when a layer 1 partial destination ID included in the SCI matches a layer 1 partial source ID of the receiving UE.

Method 3. A receiving UE may receive SCI transmitted by a transmitting UE. For example, in the case of unicast transmission, the receiving UE may start an SL drx-InactivityTimer only when it is confirmed that a layer 1 partial source ID included in the SCI is the same as a layer 1 partial source ID of a peer transmitting UE with which it has a unicast connection. For example, the layer 1 partial source ID of the peer transmitting UE may be the unicast layer 1 partial destination ID of the receiving UE itself.

Method 4. A receiving UE may receive SCI transmitted by a transmitting UE. For example, in the case of unicast transmission, when the receiving UE receives an SCI transmitted by the transmitting UE, when a layer 1 partial destination ID included in the SCI matches a layer 1 partial source ID of the receiving UE, and when a layer 1 partial source ID included in the SCI is the same as a layer 1 partial source ID of a peer transmitting UE with which it has a unicast connection, the receiving UE may check the address field of a PSSCH's MAC header related to a PSCCH (SCI). For example, the layer 1 partial source ID of the peer transmitting UE may be the unicast layer 1 partial destination ID of the receiving UE itself. That is, the receiving UE may start an SL drx-InactivityTimer only when a 24-bit destination ID, which is a combination of 16-bit destination ID included in the SCI and an 8-bit destination ID included in the MAC header, is the same as its own 24-bit source ID.

Method 5. A receiving UE may receive a PSCCH (SCI) transmitted by a transmitting UE. For example, in the case of unicast transmission, when the receiving UE receives the SCI transmitted by the transmitting UE, when a layer 1 partial destination ID included in the SCI matches a layer 1 partial source ID of the receiving UE and a layer 1 partial source ID included in the SCI is also the same as a layer 1 partial source ID of a peer transmitting UE that has a unicast connection with itself, the receiving UE may check the address field of a PSSCH's MAC header related to a PSCCH (SCI). For example, the layer 1 partial source ID of the peer transmitting UE may be the unicast layer 1 partial destination ID of the receiving UE itself. That is, only when a 24-bit destination ID, which is a combination of a 16-bit destination ID included in the SCI and an 8-bit destination ID included in the MAC header, is the same as its own 24-bit source ID, and at the same time, when a 24-bit source ID, which is a combination of an 8-bit source ID included in the SCI and a 16-bit source ID included in the MAC header, matches its own 24-bit unicast destination ID with which it has a unicast connection, the receiving UE may start an SL drx-InactivityTimer.

Method 6. A receiving UE may receive a PSCCH (SCI) transmitted by a transmitting UE. For example, in the case of groupcast transmission, when the receiving UE receives the SCI transmitted by the transmitting UE, the receiving UE may start an SL drx-InactivityTimer only when a layer 1 partial destination ID for a 24-bit groupcast ID included in the SCI matches a layer 1 partial destination ID for the receiving UE's own 24-bit groupcast ID.

Method 7. A receiving UE may receive a PSCCH (SCI) transmitted by a transmitting UE. For example, in the case of groupcast transmission, when the receiving UE receives the SCI transmitted by the transmitting UE, the receiving UE may check the remaining address ID included in the address field of a PSSCH's MAC header related to a PSCCH (SCI) only when a layer 1 partial destination ID for a 24-bit groupcast ID included in the SCI matches a layer 1 partial destination ID for a 24-bit groupcast ID of the receiving UE itself.

Method 8. A receiving UE may receive a PSCCH (SCI) transmitted by a transmitting UE. For example, in the case of broadcast transmission, when the receiving UE receives the SCI transmitted by the transmitting UE, the receiving UE may start an SL drx-InactivityTimer only when a layer 1 partial destination ID for a 24-bit broadcast ID included in the SCI matches a layer 1 partial destination ID for a 24-bit broadcast ID of the receiving UE itself.

Method 9. A receiving UE may receive a PSCCH (SCI) transmitted by a transmitting UE. For example, in the case of broadcast transmission, when the receiving UE receives the SCI transmitted by the transmitting UE, the receiving UE may check the remaining address ID included in the address field of the MAC header of a PSSCH related to a PSCCH (SCI), only when a layer 1 partial destination ID for a 24-bit broadcast ID included in the SCI matches a layer 1 partial destination ID for a 24-bit broadcast ID of the receiving UE itself.

According to an embodiment of the present disclosure, a method of starting an SL drx-InactivityTimer by a receiving UE, when the receiving UE receives a new TB transmitted by a transmitting UE (e.g., PSSCH reception), and if at least one of the following conditions is satisfied, is proposed. For example, while an SL drx-InactivityTimer is running, a UE may continue to perform SL communication (e.g., SL transmission and/or SL reception) by maintaining an active state.

Method 1. For example, in the case of unicast, groupcast, and/or broadcast, a receiving UE may start an SL drx-InactivityTimer when receiving a PSSCH (e.g., SL data) transmitted by a transmitting UE.

Method 2. A receiving UE may receive a PSSCH (SL data) transmitted by a transmitting UE. For example, in the case of unicast transmission, when the receiving UE receives the PSSCH transmitted by the transmitting UE, the receiving UE may check the address field of a MAC header of the PSSCH only when a layer 1 partial destination ID included in the SCI related to the received PSSCH matches a layer 1 partial source ID of the receiving UE and at the same time, when it is confirmed that a layer 1 partial source ID included in the SCI is the same as a layer 1 partial source ID of the peer transmitting UE with which it has a unicast connection. For example, the layer 1 partial source ID of the peer transmitting UE may be its own unicast layer 1 partial destination ID. That is, the receiving UE may start an SL drx-InactivityTimer only when a 24-bit destination ID, which is a combination of a 16-bit destination ID included in the SCI and an 8-bit destination ID included in the MAC header, is the same as its own 24-bit source ID.

Method 3. A receiving UE may receive a PSSCH (SL data) transmitted by a transmitting UE. For example, in the case of unicast transmission, when the receiving UE receives the PSSCH transmitted by the transmitting UE, the receiving UE may check the address field of a MAC header of the PSSCH only when a layer 1 partial destination ID included in the SCI related to the received PSSCH matches the layer 1 partial source ID of the receiving UE, and at the same time, when it is confirmed that a layer 1 partial source ID included in the SCI is the same as the layer 1 partial source ID of the peer transmitting UE with which it has a unicast connection. For example, the layer 1 partial source ID of the peer transmitting UE may be the unicast layer 1 partial destination ID of the receiving UE itself. That is, the receiving UE may start an SL drx-InactivityTimer only when the 24-bit destination ID, which is a combination of a 16-bit destination ID included in the SCI and an 8-bit destination ID included in the MAC header, is the same as the own 24-bit source ID, and at the same time, when a 24-bit source ID, which is a combination of an 8-bit source ID included in the SCI and a 16-bit source ID included in the MAC header, matches the own 24-bit unicast destination ID.

Method 4. A receiving UE may receive a PSSCH (SL data) transmitted by a transmitting UE. For example, in the case of groupcast transmission, when the receiving UE receives the PSSCH transmitted by the transmitting UE, the receiving UE may check the remaining address ID included in the address field of the MAC header of the PSSCH only when a layer 1 partial destination ID for a 24-bit groupcast ID included in the SCI related to the received PSSCH matches a layer 1 partial destination ID for a 24-bit groupcast ID of the receiving UE itself. That is, the receiving UE may start an SL drx-InactivityTimer only when a 24-bit destination ID, which is a combination of a 16-bit destination ID included in the SCI and an 8-bit destination ID included in the MAC header, is the same as the own 24-bit groupcast destination ID.

Method 5. A receiving UE may receive a PSSCH (SL data) transmitted by a transmitting UE. For example, in the case of broadcast transmission, when the receiving UE receives the PSSCH transmitted by the transmitting UE, the receiving UE may check the remaining address ID included in the address field of a MAC header of the PSSCH only when a layer 1 partial destination ID for a 24-bit broadcast ID included in the SCI related to the received PSSCH matches a layer 1 partial destination ID for a 24-bit broadcast ID of the receiving UE itself. That is, the receiving UE may start an SL drx-InactivityTimer only when a 24-bit destination ID, which is a combination of a 16-bit destination ID included in the SCI and an 8-bit destination ID included in the MAC header, is the same as its own 24-bit broadcast destination ID.

Figure 10:
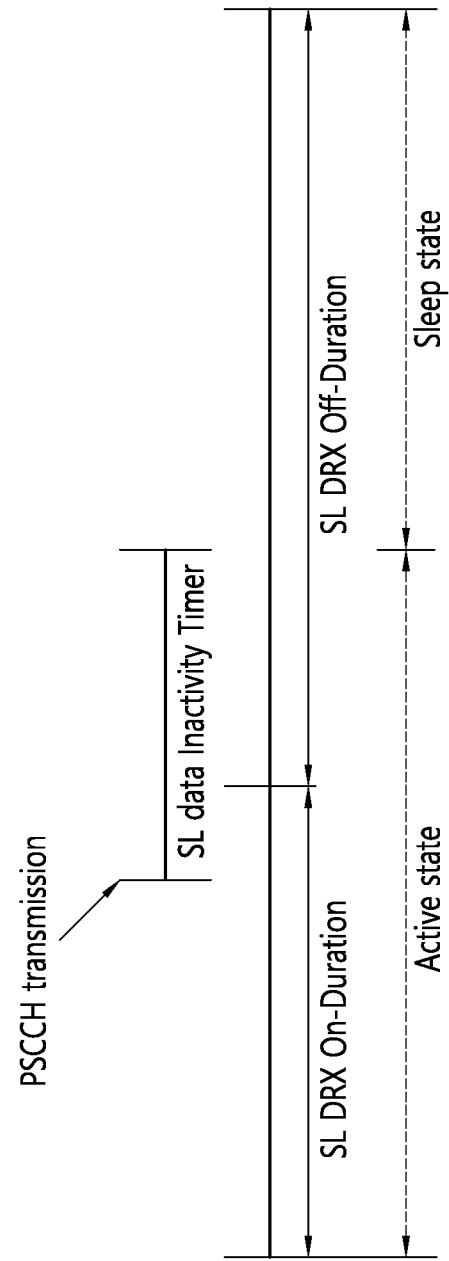
FIG. 10 shows extending an SL on-duration period by starting an SL dataInactivityTimer when a transmitting UE transmits a PSCCH according to an embodiment of the present disclosure.

FIG. 10 shows extending an SL on-duration period by starting an SL dataInactivityTimer when a transmitting UE transmits a PSCCH according to an embodiment of the present disclosure. The embodiment of FIG. 10 may be combined with various embodiments of the present disclosure.

Referring to FIG. 10, an embodiment of a power saving operation when a transmitting UE transmits a PSCCH is shown. For example, based on PSCCH transmission, an SL dataInactivityTimer may be started. While the SL dataInactivityTimer is operating, the transmitting UE may be in an active state even when an SL DRX on-duration expires. For example, when the SL dataInactivityTimer expires in SL DRX off-duration, the transmitting UE may enter a sleep state.

Figure 11:
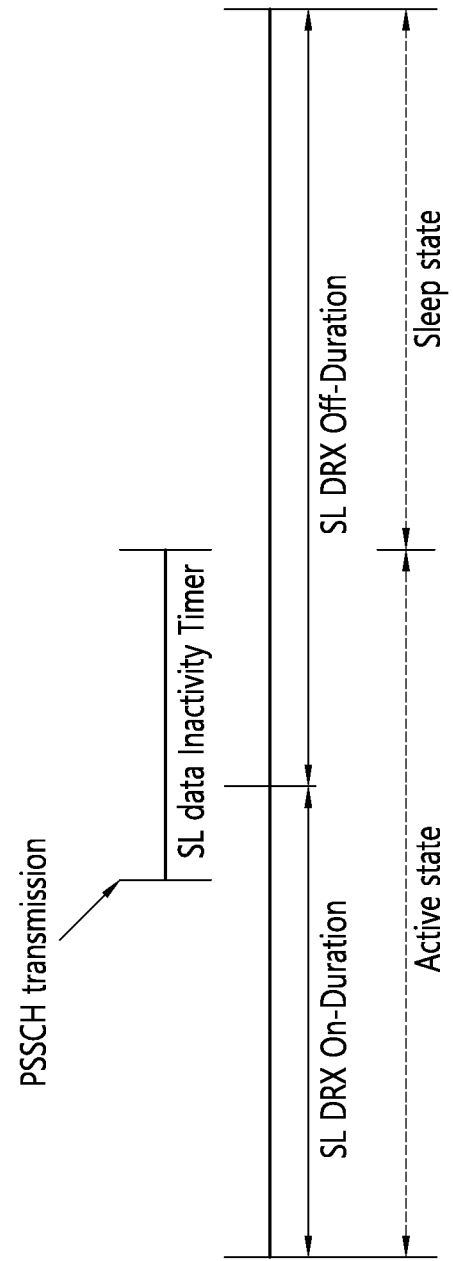
FIG. 11 shows extending an SL on-duration period by starting an SL dataInactivityTimer when a transmitting UE transmits a PSSCH according to an embodiment of the present disclosure.

FIG. 11 shows extending an SL on-duration period by starting an SL dataInactivityTimer when a transmitting UE transmits a PSSCH according to an embodiment of the present disclosure. The embodiment of FIG. 11 may be combined with various embodiments of the present disclosure.

Referring to FIG. 11, an embodiment of a power saving operation when a transmitting UE transmits a PSSCH is shown. For example, based on PSSCH transmission, an SL dataInactivityTimer may be started. While the SL dataInactivityTimer is operating, the transmitting UE may be in an active state even when an SL DRX on-duration expires. For example, when the SL dataInactivityTimer expires in SL DRX off-duration, the transmitting UE may enter a sleep state.

Figure 12:
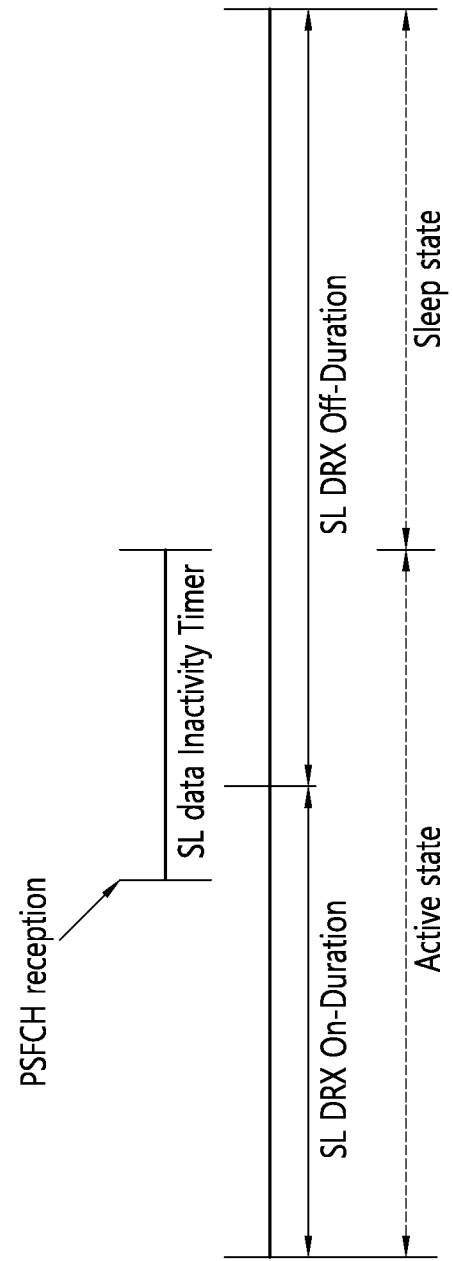
FIG. 12 shows extending an SL on-duration period by starting an SL dataInactivityTimer when a transmitting UE receives a PSFCH according to an embodiment of the present disclosure.

FIG. 12 shows extending an SL on-duration period by starting an SL dataInactivityTimer when a transmitting UE receives a PSFCH according to an embodiment of the present disclosure. The embodiment of FIG. 12 may be combined with various embodiments of the present disclosure.

Referring to FIG. 12, an embodiment of a power saving operation when a transmitting UE receives a PSFCH is shown. For example, based on reception of PSFCH, an SL dataInactivityTimer may be started. While the SL dataInactivityTimer is operating, the transmitting UE may be in an active state even when the SL DRX on-duration expires. For example, when the SL dataInactivityTimer expires in SL DRX off-duration, the transmitting UE may enter a sleep state.

Figure 13:
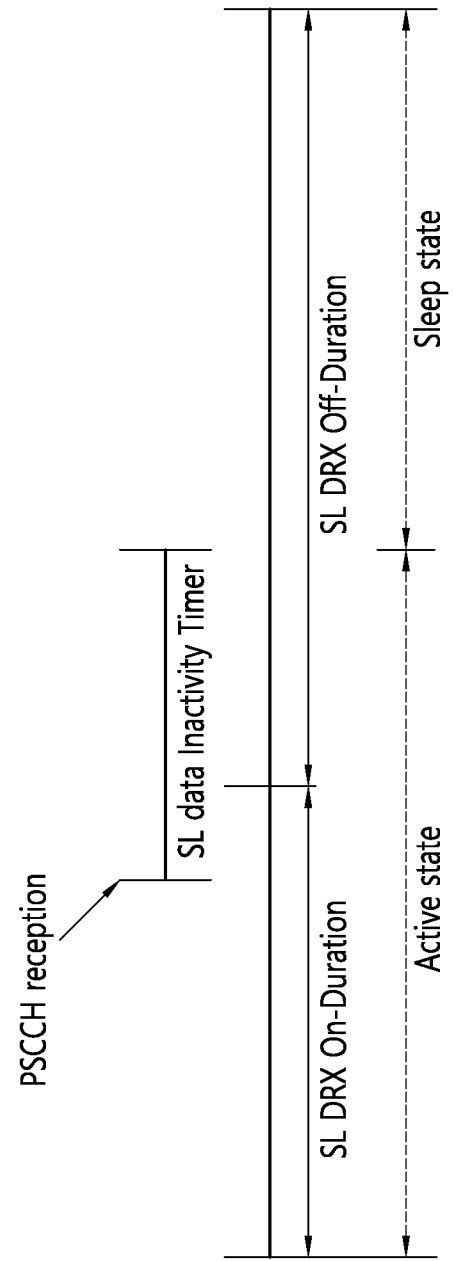
FIG. 13 shows extending an SL on-duration period by starting an SL dataInactivityTimer when a receiving UE receives a PSCCH according to an embodiment of the present disclosure.

FIG. 13 shows extending an SL on-duration period by starting an SL dataInactivityTimer when a receiving UE receives a PSCCH according to an embodiment of the present disclosure. The embodiment of FIG. 13 may be combined with various embodiments of the present disclosure.

Referring to FIG. 13, an embodiment of a power saving operation when a receiving UE receives a PSCCH is shown. For example, based on reception of PSCCH, an SL dataInactivityTimer may be started. While the SL dataInactivityTimer is operating, the receiving UE may be in an active state even when an SL DRX on-duration expires. For example, when the SL dataInactivityTimer expires in SL DRX off-duration, the receiving UE may enter a sleep state.

Figure 14:
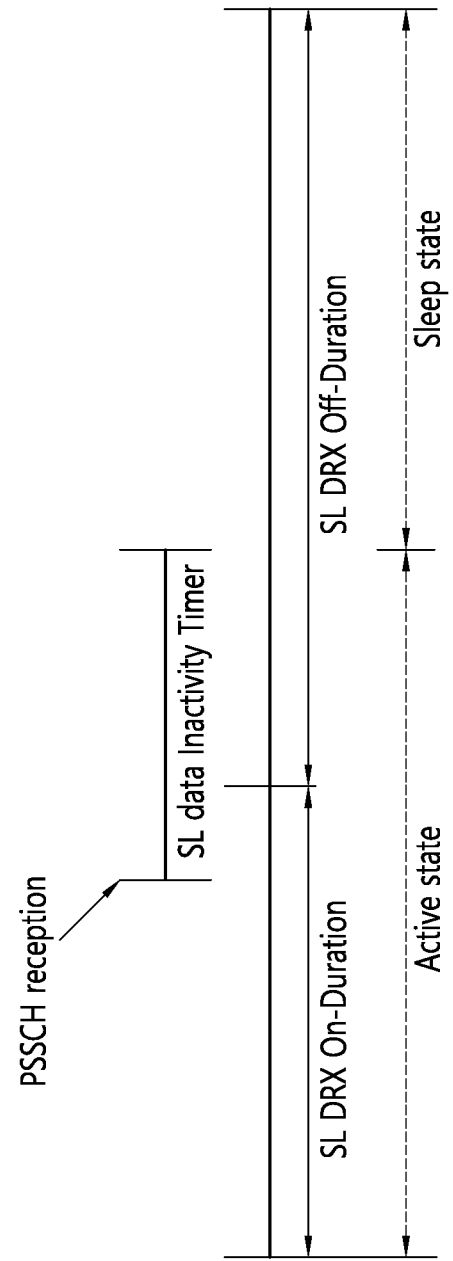
FIG. 14 shows extending an SL DRX on-duration period by starting an SL dataInactivityTimer when a receiving UE receives a PSSCH according to an embodiment of the present disclosure.

FIG. 14 shows extending an SL DRX on-duration period by starting an SL dataInactivityTimer when a receiving UE receives a PSSCH according to an embodiment of the present disclosure. The embodiment of FIG. 14 may be combined with various embodiments of the present disclosure.

Referring to FIG. 14, an embodiment of a power saving operation when a receiving UE receives a PSSCH is shown. For example, based on reception of PSSCH, an SL dataInactivityTimer may be started. While the SL dataInactivityTimer is operating, the receiving UE may be in an active state even when an SL DRX on-duration expires. For example, when the SL dataInactivityTimer expires in SL DRX off-duration, the receiving UE may enter a sleep state.

Figure 15:
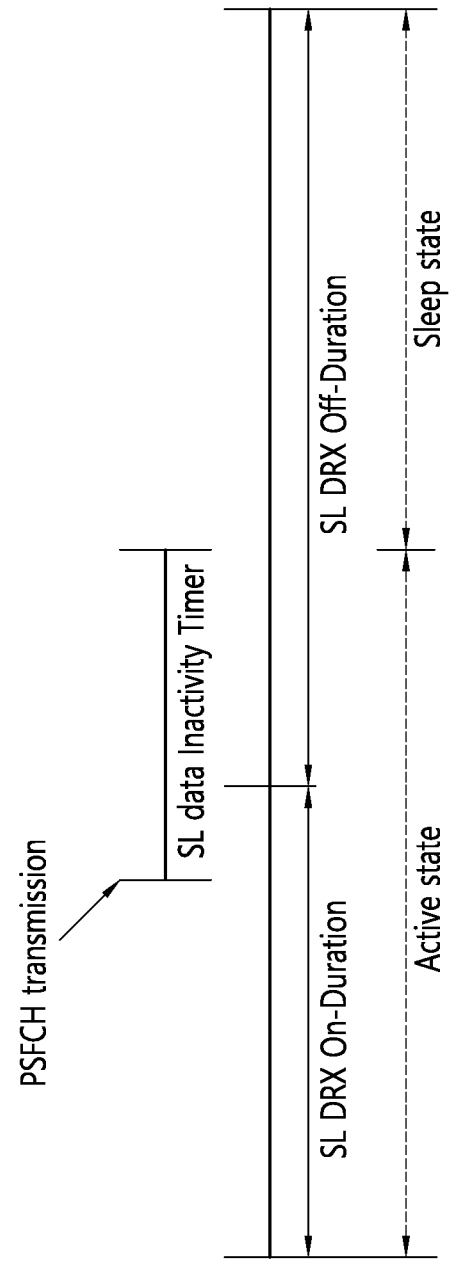
FIG. 15 shows extending an SL DRX on-duration period by starting an SL dataInactivityTimer when a receiving UE transmits a PSFCH according to an embodiment of the present disclosure.

FIG. 15 shows extending an SL DRX on-duration period by starting an SL dataInactivityTimer when a receiving UE transmits a PSFCH according to an embodiment of the present disclosure. The embodiment of FIG. 15 may be combined with various embodiments of the present disclosure.

Referring to FIG. 15, an embodiment of a power saving operation when a receiving UE transmits a PSFCH is shown. For example, based on PSFCH transmission, an SL dataInactivityTimer may be started. While the SL dataInactivityTimer is operating, the receiving UE may be in an active state even when an SL DRX on-duration expires. For example, when the SL dataInactivityTimer expires in SL DRX off-duration, the receiving UE may enter a sleep state.

According to an embodiment of the present disclosure, even if an SL DRX on-duration period or active time of each UE operating in SL DRX has expired, when a condition for determining that SL data transmission/reception is necessary is satisfied, each of the UEs may remain in an active state without transitioning to a sleep state and continue to perform SL transmission. Through this, frequent switching between a sleep state and an active state of the UE may not be caused.

Figure 16:
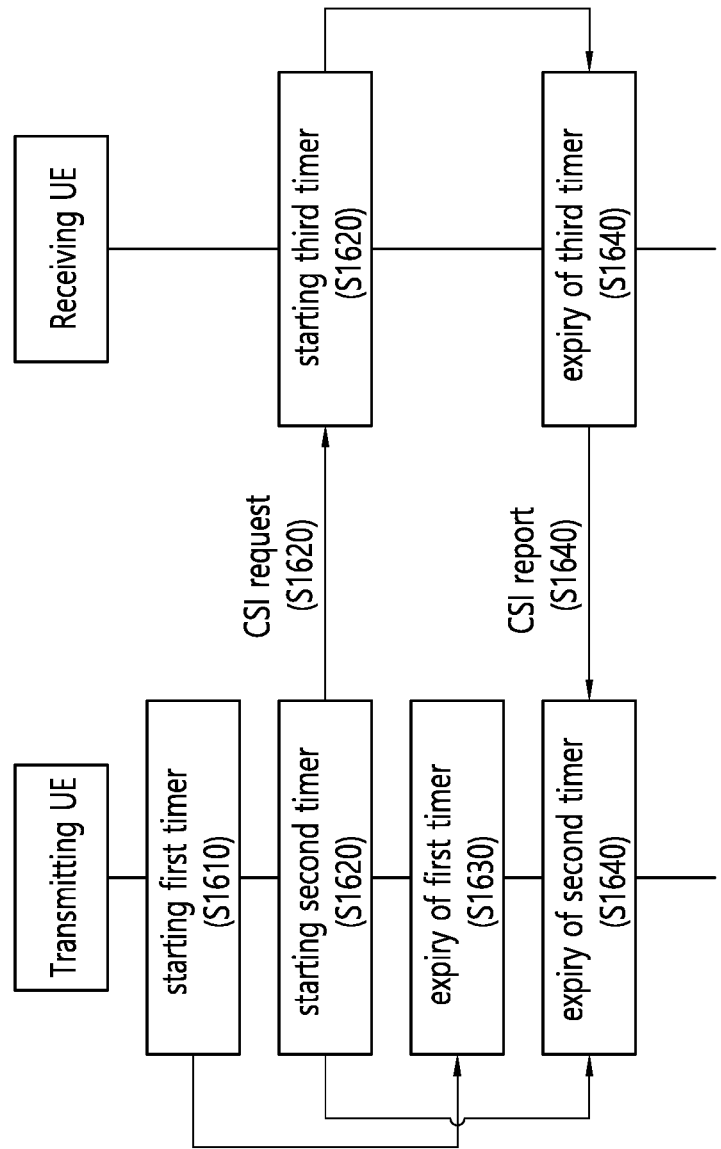
FIG. 16 shows a procedure for performing a DRX operation by a transmitting UE and a receiving UE according to an embodiment of the present disclosure.

FIG. 16 shows a procedure for performing a DRX operation by a transmitting UE and a receiving UE according to an embodiment of the present disclosure. The embodiment of FIG. 16 may be combined with various embodiments of the present disclosure.

Referring to FIG. 16, in step S1610, a transmitting UE may start a first timer. For example, the first timer may be an on-duration timer. The transmitting UE is in an active state while the on-duration timer is running and may perform SL communication. In step S1620, the transmitting UE may transmit an SCI request to a receiving UE. In addition, the transmitting UE may start a second timer while transmitting the CSI request. For example, the second timer may be a SL DRX timer. For example, while the second timer is running, the transmitting UE may be in an active state even in an off-duration. In addition, the receiving UE may start a third timer while receiving the CSI request. For example, the third timer may be a SL DRX timer. For example, the receiving UE may be in an active state even in an off-duration while the third timer is running. In step S1630, the first timer may expire. When the first timer expires, the transmitting UE may be in off-duration. In general, a UE in off-duration does not perform SL communication to save power. However, even in the off-duration, if the second timer is running, the UE may be in an active state. In step S1640, the receiving UE may transmit a CSI report to the transmitting UE. In addition, the receiving UE may expire the third timer while transmitting a CSI report. In addition, the transmitting UE may expire the second timer while receiving the CSI report.

Figure 17:
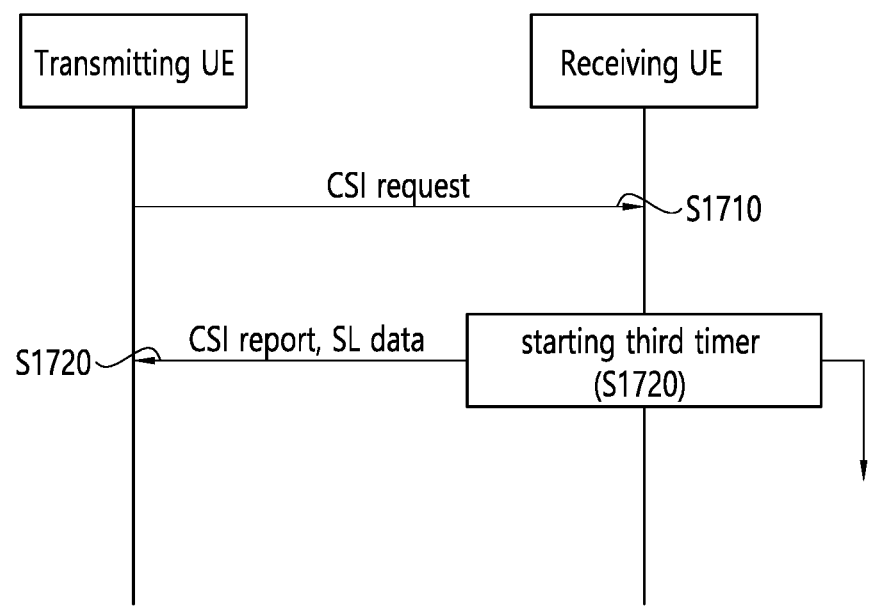
FIG. 17 shows a procedure for performing a DRX operation by a receiving UE according to an embodiment of the present disclosure.

FIG. 17 shows a procedure for performing a DRX operation by a receiving UE according to an embodiment of the present disclosure. The embodiment of FIG. 17 may be combined with various embodiments of the present disclosure.

Referring to FIG. 17, in step S1710, a transmitting UE may transmit a CSI request to a receiving UE. For example, in step S1710, the CSI request may be transmitted in on-duration according to an SL DRX configuration of the transmitting UE and the receiving UE. In step S1720, the receiving UE may transmit SL data in addition to the CSI report to the transmitting UE. Here, the receiving UE may start a third timer. While the third timer is running, even if the receiving UE is in off-duration, the receiving UE may perform SL communication in an active state. For example, the third timer may be started based on transmission of the SL data.

Figure 18:
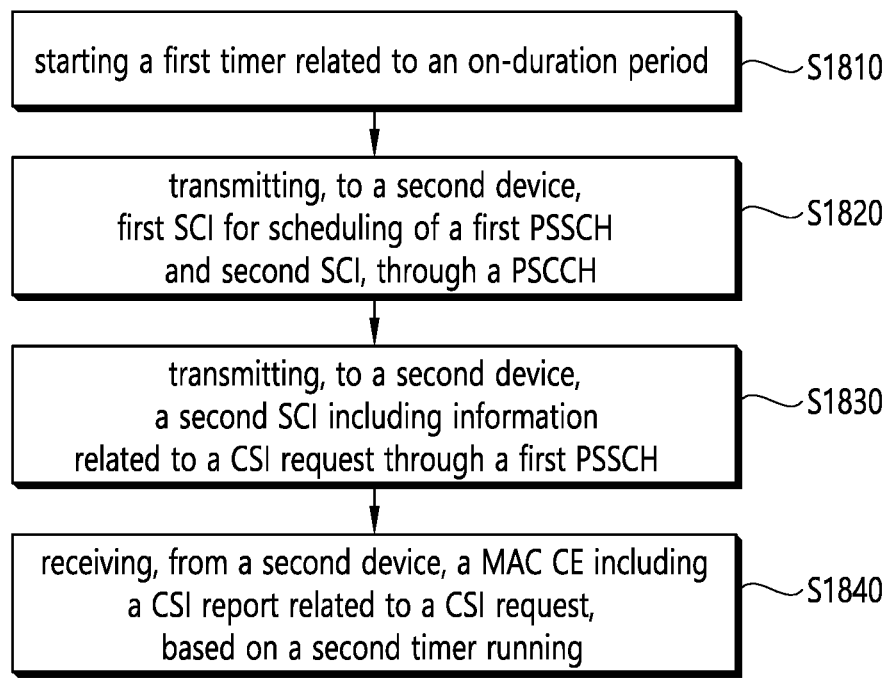
FIG. 18 shows a procedure for performing a DRX operation by a first device according to an embodiment of the present disclosure.

FIG. 18 shows a procedure for performing a DRX operation by a first device according to an embodiment of the present disclosure. The embodiment of FIG. 18 may be combined with various embodiments of the present disclosure.

Referring to FIG. 18, in step S1810, a first device may start a first timer related to an on-duration period. In step S1820, the first device may transmit, to a second device, first sidelink control information (SCI) for scheduling of a first physical sidelink shared channel (PSSCH) and second SCI, through a physical sidelink control channel (PSCCH). In step S1830, the first device may transmit, to the second device, the second SCI including information related to a channel state information (CSI) request through the first PSSCH. In step S1840, the first device may receive, from the second device, a medium access control (MAC) control element (CE) including a CSI report related to the CSI request, based on a second timer running. For example, the second timer may be started based on the second SCI.

For example, expiration time of the second timer may be equal to latency budget related to the CSI report.

For example, the MAC CE may be transmitted from the second device based on a third timer, which is started based on the second device receiving the second SCI, running.

For example, expiration time of the third timer may be equal to latency budget related to the CSI report.

For example, the third timer may be expired based on the second device transmitting the MAC CE.

For example, the MAC CE may be received while being included in a second PSSCH, the second PSSCH may include sidelink data, and a third timer included in the second device may be started, based on the second device transmitting the second PSSCH.

For example, the third timer may be an inactivity timer, based on the second PSSCH being an initially transmitted message, and the third timer may be a retransmission timer, based on the second PSSCH being a retransmitted message.

For example, additionally, the first device may expire the second timer based on the reception of the MAC CE.

For example, the first device may be in active state, based on the first timer or the second timer running, and sidelink communication related to the first device may be performed based on the first device being in active state.

For example, the second timer may be one among an on-duration timer, an inactivity timer, a hybrid automatic repeat request (HARQ) round trip time (RTT) timer, and a retransmission timer.

For example, the MAC CE may be transmitted from the second device, based on the second device being in active state.

For example, the MAC CE may be received based on receptions of a plurality of PSSCHs, and the plurality of PSSCHs may be received based on a plurality of SCIs.

For example, the second timer may run for a specific time, based on the first device receiving at least one of the plurality of PSSCHs.

The above-described embodiment may be applied to various devices described below. For example, a processor 102 of a first device 100 may start a first timer related to an on-duration period. And, the processor 102 of the first device 100 may control a transceiver 106 to transmit, to a second device 200, first sidelink control information (SCI) for scheduling of a first physical sidelink shared channel (PSSCH) and second SCI, through a physical sidelink control channel (PSCCH). And, the processor 102 of the first device 100 may control the transceiver 106 to transmit, to the second device 200, the second SCI including information related to a channel state information (CSI) request through the first PSSCH. And, the processor 102 of the first device 100 may control the transceiver 106 to receive, from the second device 200, a medium access control (MAC) control element (CE) including a CSI report related to the CSI request, based on a second timer running. For example, the second timer may be started based on the second SCI.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: start a first timer related to an on-duration period; transmit, to a second device, first sidelink control information (SCI) for scheduling of a first physical sidelink shared channel (PSSCH) and second SCI, through a physical sidelink control channel (PSCCH); transmit, to the second device, the second SCI including information related to a channel state information (CSI) request through the first PSSCH; and receive, from the second device, a medium access control (MAC) control element (CE) including a CSI report related to the CSI request, based on a second timer running, wherein the second timer may be started based on the second SCI.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: start a first timer related to an on-duration period; transmit, to a second UE, first sidelink control information (SCI) for scheduling of a first physical sidelink shared channel (PSSCH) and second SCI, through a physical sidelink control channel (PSCCH); transmit, to the second UE, the second SCI including information related to a channel state information (CSI) request through the first PSSCH; and receive, from the second UE, a medium access control (MAC) control element (CE) including a CSI report related to the CSI request, based on a second timer running, wherein the second timer may be started based on the second SCI.

According to an embodiment of the present disclosure, a non-transitory computer-readable storage medium storing instructions may be proposed. For example, the instructions, when executed, may cause a first device to: start a first timer related to an on-duration period; transmit, to a second device, first sidelink control information (SCI) for scheduling of a first physical sidelink shared channel (PSSCH) and second SCI, through a physical sidelink control channel (PSCCH); transmit, to the second device, the second SCI including information related to a channel state information (CSI) request through the first PSSCH; and receive, from the second device, a medium access control (MAC) control element (CE) including a CSI report related to the CSI request, based on a second timer running, wherein the second timer may be started based on the second SCI.

Figure 19:
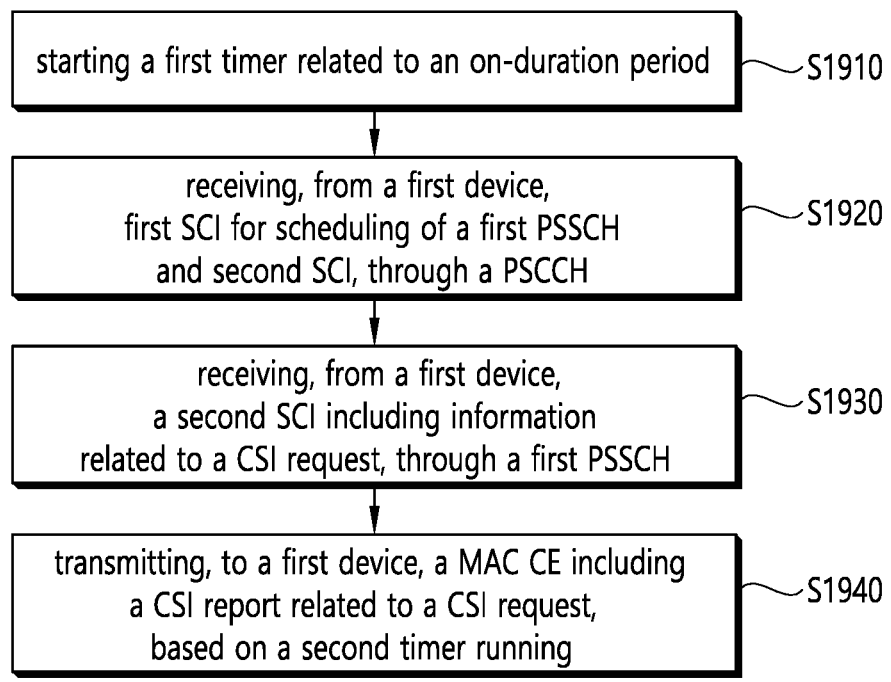
FIG. 19 shows a procedure for performing a DRX operation by a second device according to an embodiment of the present disclosure.

FIG. 19 shows a procedure for performing a DRX operation by a second device according to an embodiment of the present disclosure. The embodiment of FIG. 19 may be combined with various embodiments of the present disclosure.

Referring to FIG. 19, in step S1910, a second device may start a first timer related to an on-duration period. In step S1920, the second device may receive, from a first device, first sidelink control information (SCI) for scheduling of a first physical sidelink shared channel (PSSCH) and second SCI, through a physical sidelink control channel (PSCCH). In step S1930, the second device may receive, from the first device, the second SCI including information related to a channel state information (CSI) request, through the first PSSCH. In step S1940, the second device may transmit, to the first device, a medium access control (MAC) control element (CE) including a CSI report related to the CSI request, based on a second timer running. For example, the second timer may be started based on the second SCI.

For example, the second timer may be started based on the second device receiving the second SCI, and expiration time of the second timer is equal to latency budget related to the CSI report.

The above-described embodiment may be applied to various devices described below. For example, a processor 202 of a second device 200 may start a first timer related to an on-duration period. And, the processor 202 of the second device 200 may control a transceiver 206 to receive, from a first device 100, first sidelink control information (SCI) for scheduling of a first physical sidelink shared channel (PSSCH) and second SCI, through a physical sidelink control channel (PSCCH). And, the processor 202 of the second device 200 may control the transceiver 206 to receive, from the first device 100, the second SCI including information related to a channel state information (CSI) request, through the first PSSCH. And, the processor 202 of the second device 200 may control the transceiver 206 to transmit, to the first device 100, a medium access control (MAC) control element (CE) including a CSI report related to the CSI request, based on a second timer running. For example, the second timer may be started based on the second SCI.

According to an embodiment of the present disclosure, a second device for performing wireless communication may be proposed. For example, the second device may comprise: one or more memories storing instructions; one or more transceivers; and one or more processors connected to the one or more memories and the one or more transceivers. For example, the one or more processors may execute the instructions to: start a first timer related to an on-duration period; receive, from a first device, first sidelink control information (SCI) for scheduling of a first physical sidelink shared channel (PSSCH) and second SCI, through a physical sidelink control channel (PSCCH); receive, from the first device, the second SCI including information related to a channel state information (CSI) request, through the first PSSCH; and transmit, to the first device, a medium access control (MAC) control element (CE) including a CSI report related to the CSI request, based on a second timer running, wherein the second timer may be started based on the second SCI.

For example, the second timer may be started based on the second device receiving the second SCI, and expiration time of the second timer may be equal to latency budget related to the CSI report.

For example, in the present disclosure, a second timer may include a timer that causes a UE to operate with an active time related to SL DRX configuration.

Some procedures and technical specifications related to the present disclosure may refer to the standard documents in Tables 6 to 9 below.

TABLE 6

| 3GPP TS 38.321 V16.2.1 |
|---|
| The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6]. |
|    NOTE 1:      If Sidelink resource allocation mode 1 is configured by RRC, a DRX functionality is not configured. |
| RRC controls DRX operation by configuring the following parameters:<br>   -      drx-onDurationTimer: the duration at the beginning of a DRX cycle;<br>   -      drx-SlotOffset: the delay before starting the drx-onDurationTimer;<br>   -      drx-InactivityTimer: the duration after the PDCCH occasion in which a PDCCH indicates a new UL or DL transmission for the MAC entity;<br>   -      drx-RetransmissionTimerDL (per DL HARQ process except for the broadcast process): the maximum duration until a DL retransmission is received;<br>   -      drx-RetransmissionTimerUL (per UL HARQ process): the maximum duration until a grant for UL retransmission is received;<br>   -      drx-LongCycleStartOffset: the Long DRX cycle and drx-StartOffset which defines the subframe where the Long and Short DRX cycle starts;<br>   -      drx-ShortCycle (optional): the Short DRX cycle;<br>   -      drx-ShortCycleTimer (optional): the duration the UE shall follow the Short DRX cycle; |

TABLE 6-continued

3GPP TS 38.321 V16.2.1

- drx-HARQ-RTT-TimerDL (per DL HARQ process except for the broadcast process): the minimum duration before a DL assignment for HARQ retransmission is expected by the MAC entity;
- drx-HARQ-RTT-TimerUL (per UL HARQ process): the minimum duration before a UL HARQ retransmission grant is expected by the MAC entity;
- ps-Wakeup (optional): the configuration to start associated drx-onDurationTimer in case DCP is monitored but not detected;
- ps-TransmitOtherPeriodicCSI (optional): the configuration to report periodic CSI that is not L1-RSRP on PUCCH during the time duration indicated by drx-onDurationTimer in case DCP is configured but associated drx-onDurationTimer is not started;
- ps-TransmitPeriodicL1-RSRP (optional): the configuration to transmit periodic CSI that is L1-RSRP on PUCCH during the time duration indicated by drx-onDurationTimer in case DCP is configured but associated drx-onDurationTimer is not started.

TABLE 7

Serving Cells of a MAC entity may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The DRX parameters that are separately configured for each DRX group are: drx-onDurationTimer, drx-InactivityTimer. The DRX parameters that are common to the DRX groups are: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.
When a DRX cycle is configured, the Active Time for Serving Cells in a DRX group includes the time while:
- drx-onDurationTimer or drx-InactivityTimer configured for the DRX group is running; or
- drx-RetransmissionTimerDL or drx-RetransmissionTimerUL is running on any Serving Cell in the DRX group; or
- ra-ContentionResolutionTimer (as described in clause 5.1.5) or msgB-ResponseWindow (as described in clause 5.1.4a) is running; or
- a Scheduling Request is sent on PUCCH and is pending (as described in clause 5.4.4); or
- a PDCCH indicating a new transmission addressed to the C-RNTI of the MAC entity has not been received after successful reception of a Random Access Response for the Random Access Preamble not selected by the MAC entity among the contention-based Random Access Preamble (as described in clauses 5.1.4 and 5.1.4a).

When DRX is configured, the MAC entity shall:
1> if a MAC PDU is received in a configured downlink assignment:
   2> start the drx-HARQ-RTT-TimerDL for the corresponding HARQ process in the first symbol after the end of the corresponding transmission carrying the DL HARQ feedback;
   2> stop the drx-RetransmissionTimerDL for the corresponding HARQ process.
1> if a MAC PDU is transmitted in a configured uplink grant and LBT failure indication is not received from lower layers:
   2> start the drx-HARQ-RTT-TimerUL for the corresponding HARQ process in the first symbol after the end of the first repetition of the corresponding PUSCH transmission;
   2> stop the drx-RetransmissionTimerUL for the corresponding HARQ process.
1> if a drx-HARQ-RTT-TimerDL expires:
   2> if the data of the corresponding HARQ process was not successfully decoded:
      3> start the drx-RetransmissionTimerDL for the corresponding HARQ process in the first symbol after the expiry of drx-HARQ-RTT-TimerDL.
1> if a drx-HARQ-RTT-TimerUL expires:
   2> start the drx-RetransmissionTimerUL for the corresponding HARQ process in the first symbol after the expiry of drx-HARQ-RTT-TimerUL.
1> if a DRX Command MAC CE or a Long DRX Command MAC CE is received:
   2> stop drx-onDurationTimer for each DRX group;
   2> stop drx-InactivityTimer for each DRX group.
1> if drx-InactivityTimer for a DRX group expires:
   2> if the Short DRX cycle is configured:
      3> start or restart drx-ShortCycleTimer for this DRX group in the first symbol after the expiry of drx-InactivityTimer;
      3> use the Short DRX cycle for this DRX group.
   2> else:
      3> use the Long DRX cycle for this DRX group.
1> if a DRX Command MAC CE is received:
   2> if the Short DRX cycle is configured:
      3> start or restart drx-ShortCycleTimer for each DRX group in the first symbol after the end of DRX Command MAC CE reception;
      3> use the Short DRX cycle for each DRX group.
   2> else:
      3> use the Long DRX cycle for each DRX group.

TABLE 8

1> if drx-ShortCycleTimer for a DRX group expires:
    2> use the Long DRX cycle for this DRX group.
1> if a Long DRX Command MAC CE is received:
    2> stop drx-ShortCycleTimer for each DRX group;
    2> use the Long DRX cycle for each DRX group.
1> if the Short DRX cycle is used for a DRX group, and [(SFN × 10) + subframe number] modulo (drx-ShortCycle) = (drx-StartOffset) modulo (drx-ShortCycle):
    2> start drx-onDurationTimer for this DRX group after drx-SlotOffset from the beginning of the subframe.
1> if the Long DRX cycle is used for a DRX group, and [(SFN × 10) + subframe number] modulo (drx-LongCycle) = drx-StartOffset:
    2> if DCP monitoring is configured for the active DL BWP as specified in TS 38.213 [6], clause 10.3:
        3> if DCP indication associated with the current DRX cycle received from lower layer indicated to start drx-onDurationTimer, as specified in TS 38.213 [6]; or
        3> if all DCP occasion(s) in time domain, as specified in TS 38.213 [6], associated with the current DRX cycle occurred in Active Time considering grants/assignments/DRX Command MAC CE/Long DRX Command MAC CE received and Scheduling Request sent until 4 ms prior to start of the last DCP occasion, or within BWP switching interruption length, or during a measurement gap, or when the MAC entity monitors for a PDCCH transmission on the search space indicated by recoverySearchSpaceId of the SpCell identified by the C-RNTI while the ra-ResponseWindow is running (as specified in clause 5.1.4); or
        3> if ps-Wakeup is configured with value true and DCP indication associated with the current DRX cycle has not been received from lower layers:
            4> start drx-onDurationTimer after drx-SlotOffset from the beginning of the subframe
    2> else:
        3> start drx-onDurationTimer for this DRX group after drx-SlotOffset from the beginning of the subframe.
NOTE 2: In case of unaligned SFN across carriers in a cell group, the SFN of the SpCell is used to calculate the DRX duration.
1> if a DRX group is in Active Time:
    2> monitor the PDCCH on the Serving Cells in this DRX group as specified in TS 38.213 [6];
    2> if the PDCCH indicates a DL transmission:
        3> start the drx-HARQ-RTT-TimerDL for the corresponding HARQ process in the first symbol after the end of the corresponding transmission carrying the DL HARQ feedback;
NOTE 3: When HARQ feedback is postponed by PDSCH-to-HARQ_feedback timing indicating a non-numerical k1 value, as specified in TS 38.213 [6], the corresponding transmission opportunity to send the DL HARQ feedback is indicated in a later PDCCH requesting the HARQ-ACK feedback.
        3> stop the drx-RetransmissionTimerDL for the corresponding HARQ process.
        3> if the PDSCH-to-HARQ_feedback timing indicate a non-numerical k1 value as specified in TS 38.213 [6]:
            4> start the drx-RetransmissionTimerDL in the first symbol after the PDSCH transmission for the corresponding HARQ process.
    2> if the PDCCH indicates a UL transmission:
        3> start the drx-HARQ-RTT-TimerUL for the corresponding HARQ process in the first symbol after the end of the first repetition of the corresponding PUSCH transmission;
        3> stop the drx-RetransmissionTimerUL for the corresponding HARQ process.
    2> if the PDCCH indicates a new transmission (DL or UL) on a Serving Cell in this DRX group:
        3> start or restart drx-InactivityTimer for this DRX group in the first symbol after the end of the PDCCH reception.
    2> if a HARQ process receives downlink feedback information and acknowledgement is indicated:
        3> stop the drx-RetransmissionTimerUL for the corresponding HARQ process.

TABLE 9

1> if DCP monitoring is configured for the active DL BWP as specified in TS 38.213 [6], clause 10.3; and
1> if the current symbol n occurs within drx-onDurationTimer duration; and
1> if drx-onDurationTimer associated with the current DRX cycle is not started as specified in this clause:
    2> if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this clause:
        3> not transmit periodic SRS and semi-persistent SRS defined in TS 38.214 [7];
        3> not report semi-persistent CSI configured on PUSCH;
        3> if ps-TransmitPeriodicL1-RSRP is not configured with value true:
            4> not report periodic CSI that is L1-RSRP on PUCCH.
        3> if ps-TransmitOtherPeriodicCSI is not configured with value true:
            4> not report periodic CSI that is not L1-RSRP on PUCCH.
1> else:
    2> in current symbol n, if a DRX group would not be in Active Time considering grants/assignments scheduled on Serving Cell(s) in this DRX group and DRX Command MAC CE/Long DRX Command MAC CE received and Scheduling Request sent until 4 ms prior to symbol n when evaluating all DRX Active Time conditions as specified in this clause:
        3> not transmit periodic SRS and semi-persistent SRS defined in TS 38.214 [7] in this DRX group;
        3> not report CSI on PUCCH and semi-persistent CSI configured on PUSCH in this DRX group.

TABLE 9-continued

| | |
|---|---|
| | 2> if CSI masking (csi-Mask) is setup by upper layers:<br>    3> in current symbol n, if drx-onDurationTimer of a DRX group would not be running considering<br>       grants/assignments scheduled on Serving Cell(s) in this DRX group and DRX Command MAC<br>       CE/Long DRX Command MAC CE received until 4 ms prior to symbol n when evaluating all<br>       DRX Active Time conditions as specified in this clause; and<br>    4> not report CSI on PUCCH in this DRX group. |
| NOTE 4: | If a UE multiplexes a CSI configured on PUCCH with other overlapping UCI(s) according to the procedure specified in TS 38.213 [6] clause 9.2.5 and this CSI multiplexed with other UCI(s) would be reported on a PUCCH resource outside DRX Active Time of the DRX group in which this PUCCH is configured, it is up to UE implementation whether to report this CSI multiplexed with other UCI(s). |

Regardless of whether the MAC entity is monitoring PDCCH or not on the Serving Cells in a DRX group, the MAC entity transmits HARQ feedback, aperiodic CSI on PUSCH, and aperiodic SRS defined in TS 38.214 [7] on the Serving Cells in the DRX group when such is expected.
The MAC entity needs not to monitor the PDCCH if it is not a complete PDCCH occasion (e.g. the Active Time starts or ends in the middle of a PDCCH occasion).

On the other hand, NR V2X of Release 16 did not support a power saving operation of a UE, and will support the power saving operation of a UE from release 17 NR V2X.

For a power saving operation (e.g., SL DRX operation) of a UE, an SL DRX configuration (SL DRX cycle, SL DRX on-duration, SL DRX operation-related timer) to be used by a Power Saving UE (P-UE) may need to be defined. In addition, a UE may need to be able to perform an SL CSI reporting procedure well while performing an SL DRX operation.

Therefore, in the embodiment(s) of the present disclosure, an SL DRX configuration for power saving operation of a UE is defined, and a method in which a UE performs an SL DRX operation using a defined SL DRX configuration and simultaneously performs a CSI reporting procedure well is proposed. In the following description, 'when, if, in case of' may be replaced with 'based on'.

In the present disclosure, a transmitting UE may refer to a UE triggering transmission of a CSI report MAC CE, and a receiving UE may refer to a UE that receives a CSI report MAC CE triggering message (i.e., SCI) and transmits the CSI report MAC CE (that is, a UE that triggers a CSI report MAC CE through SCI) to a counterpart peer UE.

Proposal 1. In proposal 1, a procedure for performing a CSI reporting procedure while a transmitting UE and a receiving UE perform an SL DRX operation is proposed.

According to the conventional CSI reporting procedure, a UE triggers the CSI report of a receiving UE through a PSSCH (SCI), when the transmitting UE checks the CSI reporting trigger indicated in the transmitted SCI, the receiving UE transmits the CSI report MAC CE to the transmitting UE. In addition, the transmitting UE transmits a time requirement for transmitting the CSI report (latency budget value for CSI reporting) to the receiving UE. That is, the receiving UE must complete CSI report MAC CE transmission within the latency budget for CSI reporting.

According to an embodiment of the present disclosure, when a transmitting UE triggers a CSI report through SCI (i.e., transmits an SCI triggering a CSI report), the transmitting UE may extend an SL DRX on-duration by an SL DRX Inactivity Timer by starting the SL DRX Inactivity Timer (a timer extending an SL DRX on-duration). At this time, the SL DRX Inactivity Timer (or another SL DRX related timer: a timer that extends an active time) may be set as much as a time requirement (latency budget for CSI reporting: a transmitting UE may transmit a "latency budget for CSI report MAC CE" to a receiving UE through a PC5 RRC message.) for a receiving UE to transmit a CSI report (since a receiving UE can transmit a CSI report MAC CE within the corresponding time, a transmitting UE may have to operate as active time for the corresponding time.). Instead of an SL DRX Inactivity Timer, a separate timer (the timer value may be set as much as the latency budget for CSI reporting.) waiting for reception of a CSI report may be defined to extend an SL DRX on-duration. In addition, for example, when a transmitting UE receives an SL CSI report MAC CE transmitted by a receiving UE, the transmitting UE may cause a running timer (e.g., SL DRX timer operating for reception of normal sidelink data rather than reception of CSI report MAC CE: e.g., SL DRX on-duration timer, SL DRX Inactivity Timer, SL DRX HARQ RTT Timer, or SL DRX Retransmission Timer) to expire, or immediately enter an SL DRX off-duration after the timer expires to transition to sleep mode. Alternatively, for example, if there is an SL DRX timer in operation for reception of normal sidelink data rather than reception of CSI report MAC CE, a transmitting UE (a UE triggering a transmission of an SL CSI report MAC CE) operates based on the corresponding timer, and if the CSI report MAC CE is not received from a receiving UE until the corresponding timer expires, the transmitting UE may monitor a CSI report MAC CE transmitted by the receiving UE by extending the timer as much as the time requirement (latency budget for CSI reporting) for the receiving UE to transmit the CSI report.

According to an embodiment of the present disclosure, a receiving UE procedure is as follows. When an SCI for CSI reporting trigger transmitted by a transmitting UE is received, a receiving UE may prepare for transmission of a CSI report MAC CE. At this time, the receiving UE may start an SL DRX Inactivity Timer (a timer extending an SL DRX on-duration) and extend an SL DRX on-duration by the SL DRX Inactivity Timer. At this time, for example, the SL DRX Inactivity Timer may be set as much as the time requirement (latency budget for CSI reporting) for a receiving UE to transmit a CSI report. In addition, an SL DRX on-duration can be extended by defining a separate timer (a timer value can be set as much as the latency budget for CSI reporting) that waits for transmission of a CSI report, rather than the SL DRX Inactivity Timer.

According to an embodiment of the present disclosure, a CSI reporting SCI transmitted by a transmitting UE may always be transmitted together with data (PSSCH). Therefore, when a transmitting UE and a receiving UE each trigger a CSI report through SCI or receive a CSI report trigger SCI, the transmitting UE and the receiving UE may respectively operate an SL DRX Inactivity timer (when data is initially transmitted) or an SL DRX Retransmission timer (when data is retransmitted). ((An SL DRX Inactivity timer may be a timer that starts when a UE transmits (from the perspective of a transmitting UE) or receives (from the viewpoint of a receiving UE) the PSCCH/PSSCH, In addition, an SL DRX Retransmission timer may be a timer in which a transmitting UE waits to transmit a retransmission packet, or a timer in which a receiving UE waits to receive a retransmission packet.)) Alternatively, for example, a separate timer may be defined and operated. An SL DRX Inactivity timer/SL DRX Retransmission timer/separate timer value can be set as much as "latency budget for CSI reporting". For example, if the SL DRX Inactivity timer/SL DRX Retransmission timer/separate timer value is set to a value separate from the CSI latency budget value, a UE may operate as follows.

For example, if the CSI latency budget is longer than a timer duration, even if the timer (SL DRX Inactivity timer/SL DRX Retransmission timer/separate timer) expires, if the CSI report transmission has not been completed, a receiving UE must not enter an SL DRX off-duration and transition to the sleep mode. That is, when a timer (SL DRX Inactivity timer/SL DRX Retransmission timer/Separate timer) expires, if a current DRX operation time point is SL DRX off-duration, a receiving UE may transition to the sleep mode to reduce power consumption until the time when transmission resources are reserved for CSI report MAC CE transmission, and then wakes up at the time when transmission resources are reserved to transmit the CSI report MAC CE. Also, for example, a receiving UE may enter an SL DRX off-duration and operate in sleep mode when a CSI report MAC CE transmission is completed.

For example, a transmission UE operation may be as follows. If CSI latency budget is longer than the timer period, even if a timer (SL DRX Inactivity timer/SL DRX Retransmission timer/separate timer) expires, if a CSI report reception is not completed, a transmitting UE may not enter an SL DRX off-duration and transition to sleep mode. That is, for example, when a timer (SL DRX Inactivity timer/SL DRX Retransmission timer/separate timer) expires, if the current DRX operation time point is SL DRX off-duration, a transmitting UE may receive a CSI report MAC CE transmitted by a receiving UE by operating in an active time until the remaining latency budget of the CSI report MAC CE. Or, when a timer (SL DRX Inactivity timer/SL DRX Retransmission timer/separate timer) expires, when the current DRX operation time point is SL DRX off-duration, a transmitting UE may operate in active time by operating a separate timer equal to the remaining latency budget of the CSI report MAC CE and may receive the CSI report MAC CE transmitted by a receiving UE. For example, the transmitting UE may immediately transition to sleep mode upon receiving the CSI report MAC CE transmitted by the receiving UE.

According to an embodiment of the present disclosure, the following operations may also be supported among receiving UE operations for CSI report MAC CE transmission. For example, a receiving UE may perform CSI report MAC CE transmission through a plurality of PSSCH transmissions. A plurality of PSSCHs including redundancy bits may be transmitted for reliability of a PSSCH. If, for example, it is assumed that a receiving UE performs CSI report MAC CE transmission through transmission of 5 PSSCHs, the receiving UE may transmit 2 SCI and perform 5 PSSCH (CSI report MAC CE) transmission. That is, transmission of three PSSCHs out of five PSSCHs may be performed through the 1st SCI. That is, there is a PSSCH transmitted together with the 1st SCI, and resources of the second/third transmission of the PSSCH may be reserved and indicated in the 1st SCI. In this way, three PSSCH transmissions can be performed through the 1st SCI. The receiving UE may indicate and transmit the remaining two PSSCH transmissions through the 2nd SCI. That is, the receiving UE may transmit the CSI report MAC CE through transmission of 5 PSSCHs. A transmitting UE may complete reception of a reliable CSI report MAC CE when completing reception of 5 PSSCHs transmitted by the receiving UE.

At this time, for example, the following error operation may be performed on a transmitting UE side. For example, when the transmitting UE completes reception of three PSSCHs by receiving the 1st SCI transmitted by a receiving UE, a case in which reception of a 2nd SCI may be missed may occur. In this case, the transmitting UE may not be aware of the fact that the receiving UE performs the 4th/5th PSSCH transmission itself. That is, the transmitting UE may misjudge that the receiving UE transmits the CSI report MAC CE through three PSSCHs. Therefore, a problem may occur in that the transmitting UE determines that the reception of the CSI report MAC CE is completed by receiving the three PSSCHs and transitions to the sleep mode. Therefore, in the present disclosure, in the above example, a method is proposed in which a transmitting UE remains active time for a certain period of time and then enters the SL DRX off-duration so that the transmitting UE can also receive the 4th and 5th PSSCHs of the receiving UE. Alternatively, for example, in this case, the transmitting UE may operate a separate timer so that it can operate during as an active time during the timer time. That is, a method of operating with a certain active time even if the transmitting UE determines that it has received all the PSSCHs transmitted by the receiving UE is proposed (despite the fact that the transmitting UE determines that all have been received, a problem may occur in that the transmitting UE does not recognize, by actually missing the SCI, that the next PSSCH is transmitted).

According to an embodiment of the present disclosure, among the operations of a receiving UE for CSI report MAC CE transmission, the following operations may also be supported. For example, a receiving UE may perform CSI report MAC CE transmission through a plurality of PSSCH transmissions. For example, a plurality of PSSCHs including redundancy bits may be transmitted for PSSCH reliability. If it is assumed that the receiving UE (a UE transmitting the CSI report MAC CE) transmits CSI report MAC CE through 5 PSSCH transmissions, when the transmitting UE (a UE that monitors a CSI report MAC CE transmitted by the other UE by triggering CSI report MAC CE with SCI) completes reception of 5 PSSCHs transmitted by a receiving UE, it may complete receiving a reliable CSI report MAC CE. At this time, for example, the following error operation may be performed on the transmitting UE side. For example, the transmitting UE may receive the 1st SCI transmitted by the receiving UE, but miss reception of the 2nd SCI transmitted from the next resource reserved in the 1st SCI. In this case, since the transmitting UE cannot check the next resource information included in the 2nd SCI transmitted by the receiving UE, The transmitting UE may not be aware of the fact that the receiving UE performs PSSCH (CSI report MAC CE related TB) transmission. That is, the transmitting UE may mistakenly determine that the CSI report MAC CE is transmitted by transmitting fewer TBs than the total number of TBs (PSSCH) transmitted by the receiving UE. Therefore, a problem may occur in that the transmitting UE receives fewer TBs than the total number of TBs transmitted by the receiving UE and transitions to the sleep mode by determining that the CSI report and MAC CE reception is complete. Therefore, in the present disclosure, In the previous example, A method in which the transmitting UE remains active time for a certain period of time and then enters the SL DRX off-duration so that the transmitting UE can also receive the PSSCH missed by the receiving UE is proposed. Alternatively, the transmitting UE may, for example, operate a separate timer so that it can operate during the active time during the timer time. That is, a method is proposed in which the transmitting UE operates as an active time for a certain time even if all PSSCHs transmitted by the receiving UE are received (a problem may occur in which even though the transmitting UE determines that it has received all of them, it may actually miss the SCI reception and may not recognize the transmission of the next PSSCH).

According to an embodiment of the present disclosure, the following operation is proposed as a UE operation. For example, when transmitting a CSI report MAC CE, a receiving UE may transmit only the CSI report MAC CE in a MAC PDU. Alternatively, a receiving UE may transmit a MAC SDU for other sidelink data in a MAC PDU to a transmitting UE by multiplexing (MUX) with the CSI report MAC CE. At this time, the following operation is proposed.

When a receiving UE transmits a MAC PDU including only a CSI report MAC CE, in the present disclosure, when the receiving UE completes the CSI reporting and MAC CE transmission, a method of entering, by a receiving UE, the SL DRX off-duration (if the current SL DRX time point is an off-duration section) without (re)starting an SL DRX operation timer (SL DRX Inactivity Timer, SL Retransmission Timer, separately defined timer) that allows to operate in active time is proposed. Because, since a CSI report MAC CE is a message transmitted only once (one shot transmission message) and SL HARQ feedback operation is not supported, a procedure in which a receiving UE starts a timer so that the receiving UE operates in an active time may not be required.

When a receiving UE transmits a MAC PDU along with a CSI report MAC CE and the sidelink data, in the present disclosure, when the receiving UE completes the CSI report MAC CE transmission, a method of (re)starting an SL DRX operation timer (SL DRX Inactivity Timer, SL Retransmission Timer, separately defined timer) that allows the receiving UE to operate in an active time is proposed. For example, if the data included with a CSI report MAC CE in a MAC PDU is initial transmission data, the SL DRX Inactivity Timer can be started, and if the data included in a MAC PDU along with a CSI report MAC CE is a retransmission packet, an SL DRX Retransmission Timer can be started.

According to an embodiment of the present disclosure, when a receiving UE transmits a MAC PDU (MAC PDU containing only CSI report MAC CE or MAC PDU including CSI report MAC CE and sidelink data) including a CSI report MAC CE, a receiving UE may receive a MAC PDU for another sidelink service (or sidelink data), alternatively, the receiving UE may become a transmitting UE and transmit a MAC PDU for other sidelink services (or sidelink data) to other receiving UEs. In this case, the following operation is proposed in the present disclosure.

For example, when a receiving UE needs to receive a MAC PDU transmission including a CSI report MAC CE (MAC PDU containing only CSI report MAC CE, or MAC PDU containing CSI report MAC CE and sidelink data together) and a MAC PDU for another sidelink service (or sidelink data) transmitted by another transmitting UE, a method of operating a timer related to an SL DRX operation (SL DRX Inactivity, SL DRX HARQ RTT Timer, SL DRX Retransmission Timer, separately defined timer) related to a sidelink service having a higher priority (i.e. the priority value is a relatively low value) by a receiving UE comparing the priorities of two sidelink services is proposed.

For example, in the present disclosure, if a priority value is low, it may be assumed to be a high-priority sidelink service. For example, when a receiving UE has a transmission MAC PDU containing only a CSI report MAC CE, and a MAC PDU being serviced (continued to be received) from another UE, a method of performing an SL DRX operation by comparing the priority of the CSI report MAC CE with the priority value of a MAC PDU of another sidelink service (sidelink service or data continuously being received from another transmitting UE) and applying a timer related to a sidelink service having a lower priority value (high priority) is proposed.

For example, in another embodiment, when a receiving UE has a transmission MAC PDU that includes both CSI report MAC CE and sidelink data, and a MAC PDU being serviced (continued to be received) from another UE, a method of performing an SL DRX operation by comparing the priority of the service with the highest priority among the services included in the transport MAC PDU that includes the CSI report MAC CE and sidelink data, with a priority value of a MAC PDU of other sidelink service (sidelink service or data continuously being received from another transmitting UE) and applying a timer related to a sidelink service having a lower priority value (high priority) is proposed.

For example, in another embodiment, when a receiving UE needs to transmit a MAC PDU including a CSI report MAC CE (MAC PDU containing only CSI report MAC CE, or MAC PDU containing CSI report MAC CE and sidelink data together) and a MAC PDU for another sidelink service (or sidelink data) transmitted to another receiving UE by the receiving UE becoming a transmitting UE, a method in which the receiving UE compares the priorities of two sidelink services and operates a timer related to an SL DRX operation (SL DRX Inactivity, SL DRX HARQ RTT Timer, SL DRX Retransmission Timer, separately defined timer) related to a sidelink service having a higher priority (i.e. the priority value is a relatively low value) is proposed. For example, in the present disclosure, a sidelink service having a high priority may be assumed to have a low priority value. For example, when a receiving UE has a transmission MAC PDU containing only the CSI report MAC CE and a MAC PDU to be transmitted to other receiving UEs as the receiving UE becomes a transmitting UE, a method of performing an SL DRX operation by comparing the priority of the CSI report MAC CE with the priority value of the MAC PDU of another sidelink service (any other sidelink services or data that need to be transmitted) and applying a timer related to a sidelink service having a lower priority value (high priority) is proposed.

For example, in another embodiment, when a receiving UE has a transmission MAC PDU including CSI report MAC CE and sidelink data and a MAC PDU that the receiving UE becomes a transmitting UE and needs to transmit to other receiving UEs, a method of performing an SL DRX operation by comparing the priority of the service with the highest priority among the services included in the transport MAC PDU that includes the CSI report MAC CE and sidelink data, and the priority value of MAC PDU of sidelink service (sidelink service or data being transmitted to another receiving UE) transmitted to other receiving UEs and applying a timer related to a sidelink service having a low priority value (high priority) is proposed.

According to an embodiment of the present disclosure, the following technology is proposed.

For example, a UE (RQ_RXUE) receiving an SL CSI report request may perform an SL DRX timer/procedure based on SL data transmitted along with a request. What RAN2 needs to discuss is how a UE (RQ_TXUE) receiving an SL CSI report from RQ_RXUE will perform an operation related to receiving an SL CSI report. For example, solutions that may be considered include:

Option 1) A form in which an SL CSI report reception operation of RQ_TXUE is performed limited to active time. For example, there may be a scheme in which SL CSI report REQUEST transmission triggers an additional DRX TIMER that covers the report latency budget. For example, there may be a form in which the SL CSI report reception operation is limited within the existing SL DRX WAKE-UP TIME of RQ_TXUE.

Option 2) A form in which an SL CSI report reception operation of RQ_TXUE is performed regardless of active time/inactive time. For example, when the above rule is applied, additional SL data of other UEs received along with an SL CSI report may be set to be discarded (i.e., related SL DRX timers/procedures are not triggered/performed), or it can be configured to perform the relevant SL DRX timer/procedure. In the former case, for example, although the related SL DRX timer/procedure is not triggered/performed, the related PSCCH decoding result may be set to be used for sensing. In addition, for example, when RQ_RXUE MUXs and transmits additional SL DATA together with SL CSI reporting to RQ_TXUE, RQ_TXUE may be configured to (exceptionally) trigger/perform the SL DRX timer/procedure related thereto.

According to an embodiment of the present disclosure, an SL DRX timer below mentioned in the present disclosure may be used for the following purposes.

SL DRX On-Duration Timer: A period in which a UE performing an SL DRX operation must basically operate in an active time to receive a PSCCH/PSSCH of other UE.

SL DRX Inactivity Timer: A period in which a UE performing an SL DRX operation extends an SL DRX on-duration period, which is a period in which a UE performing an SL DRX operation must operate as an active time by default in order to receive a PSCCH/PSSCH of a counterpart UE. That is, an SL DRX on-duration timer may be extended by the SL DRX Inactivity Timer period. Also, for example, when a UE receives a new packet (new PSSCH transmission) from the counterpart UE, the UE may start an SL DRX Inactivity Timer to extend an SL DRX on-duration timer.

SL DRX HARQ RTT Timer: A period during which a UE performing an SL DRX operation operates in sleep mode until receiving a retransmission packet (or PSSCH assignment) transmitted by a counterpart UE. That is, when a UE starts an SL DRX HARQ RTT Timer, the UE determines that the other UE will not transmit a sidelink retransmission packet to itself until the SL DRX HARQ RTT Timer expires, and operates in sleep mode during the timer.

SL DRX Retransmission Timer: A period in which a UE performing an SL DRX operation operates as an active time to receive a retransmission packet (or PSSCH allocation) transmitted by a counterpart UE. For example, during the corresponding timer interval, a UE may monitor reception of a retransmitted sidelink packet (or PSSCH allocation) transmitted by the counterpart UE.

For example, a transmitting UE mentioned in the present disclosure may refer to a UE triggering a CSI report MAC CE, and a receiving UE may refer to a UE transmitting a CSI report MAC CE triggered by the transmitting UE.

For example, the proposal of the present disclosure may be applied and extended to a method for solving a problem in which loss occurs due to an interruption occurring during Uu Bandwidth Part (BWP) switching.

In addition, for example, when a UE supports SL multiple bandwidth parts (BWPs), it may be applied and extended as a method for solving a problem in which loss occurs due to interference occurring during SL BWP switching.

For example, the proposal of the present disclosure may be extended and applied to parameters (and timers) included in UE-pair specific SL DRX configuration, UE-pair specific SL DRX pattern, and UE-pair specific SL DRX configuration, as well as the parameters (and timers) included in the default/common SL DRX configuration, the default/common SL DRX pattern, or the default/common SL DRX configuration. In addition, the on-duration term mentioned in the proposal of the present disclosure can be extended and interpreted as an active time (a period in which the RF module operates in an awake state (the RF module is "On") to receive/transmit a radio signal), and an off-duration term may be extended and interpreted as a sleep time duration (a period operating in sleep mode (RF module is "Off") to save power. This may not mean that a transmitting UE must operate in the sleep mode compulsorily during the sleep time duration. For example, even during sleep time, if necessary, it may be allowed to operate in an active time for a sensing operation/transmission operation.).

In addition, for example, whether to apply (some) proposed methods/rules of the present disclosure and/or related parameters (e.g., threshold) may be specifically (or differently, or independently) set according to Resource pool, congestion level, service priority (and/or type), QoS requirements (e.g., delay, reliability), PQI, traffic type (e.g., (non) periodic generation), or SL Transmission resource allocation mode (mode 1, mode 2), etc.

For example, whether the proposed rule of the present disclosure is applied (and/or a related parameter setting value) may be specifically (and/or independently and/or differently) set for at least one of resource pool, service/packet type (and/or priority), QoS requirements (e.g. URLLC/EMBB traffic, reliability, delay), PQI, cast type (e.g. unicast, groupcast, broadcast), (resource pool) congestion level (e.g., CBR), SL HARQ feedback method (e.g., NACK Only feedback, ACK/NACK feedback), the case of HARQ Feedback Enabled MAC PDU (and/or HARQ Feedback Disabled MAC PDU) transmission, whether to set PUCCH-based SL HARQ feedback reporting operation, the case of pre-emption (and/or re-evaluation) (or reselection of resources based on it), (L2 or L1) (source and/or destination) ID, (L2 or L1) (source layer ID and destination layer combination of ID) ID, (L2 or L1) (combination of pair of source layer ID and destination layer ID and cast type) ID, a direction of source layer ID and destination layer ID pair, PC5 RRC connection/link, SL DRX execution, SL mode type (resource allocation mode 1, resource allocation mode 2), (non)periodic resource reservation.

The term "specific time" mentioned in the proposal of the present disclosure may refer to a time during which a UE operates as an active time for a predetermined time to receive a sidelink signal or sidelink data from a counterpart UE, or time that operates as active time by time or specific timer (SL DRX Retransmission Timer, SL DRX Inactivity Timer, or a timer that guarantees operation in active time in the DRX operation of the receiving UE) time.

In addition, for example, the proposal of the present disclosure and whether the proposed rule is applied (and/or related parameter setting values) may also be applied to mmWave SL operation.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 20:
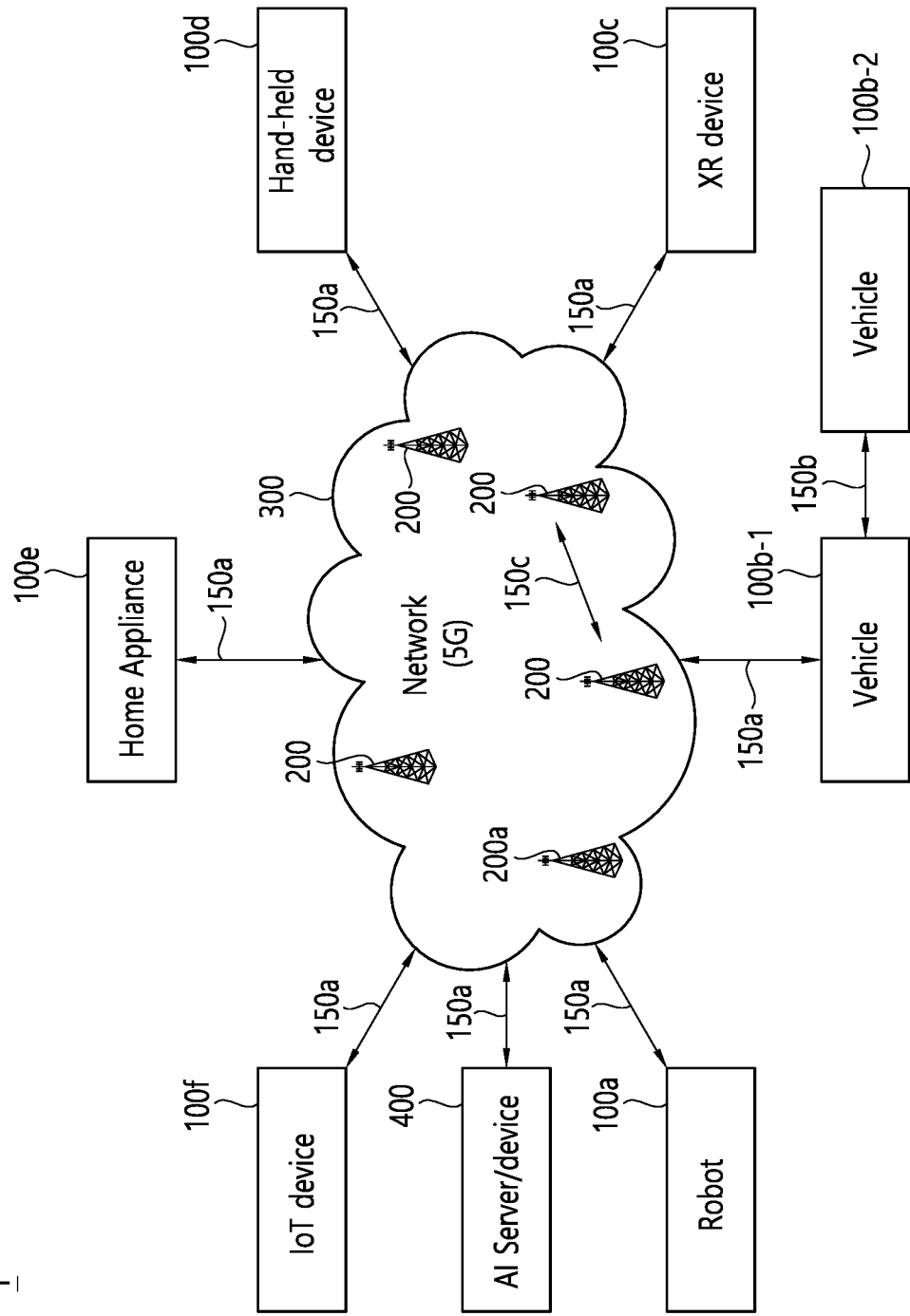
FIG. 20 shows a communication system 1, based on an embodiment of the present disclosure.

FIG. 20 shows a communication system 1, based on an embodiment of the present disclosure. The embodiment of FIG. 20 may be combined with various embodiments of the present disclosure.

Referring to FIG. 20, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 21:
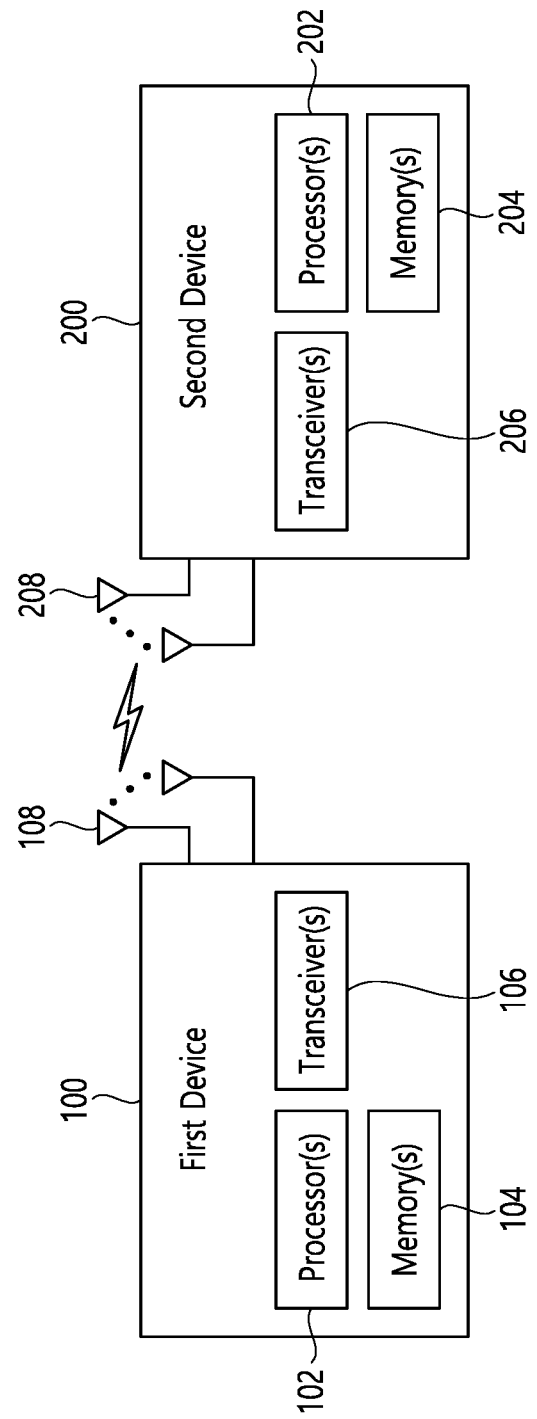
FIG. 21 shows wireless devices, based on an embodiment of the present disclosure.

FIG. 21 shows wireless devices, based on an embodiment of the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 22:
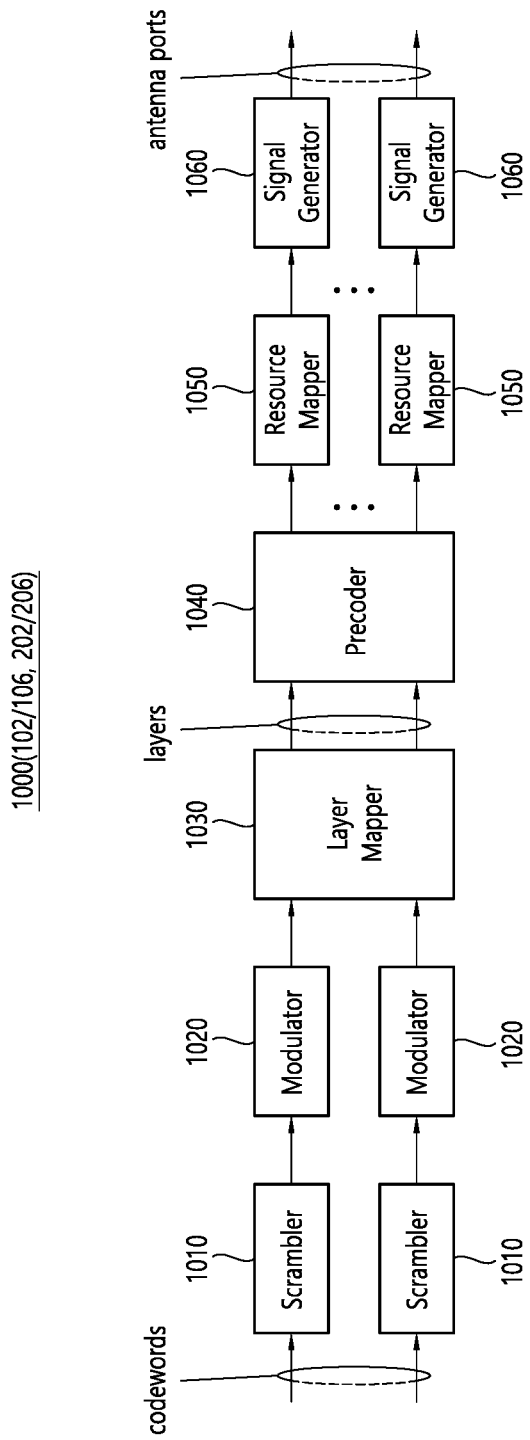
FIG. 22 shows a signal process circuit for a transmission signal, based on an embodiment of the present disclosure.

FIG. 22 shows a signal process circuit for a transmission signal, based on an embodiment of the present disclosure.

Referring to FIG. 22, a signal processing circuit 1000 may include scramblers 1010, modulators 1020, a layer mapper 1030, a precoder 1040, resource mappers 1050, and signal generators 1060. An operation/function of FIG. 22 may be performed, without being limited to, the processors 102 and 202 and/or the transceivers 106 and 206 of FIG. 21. Hardware elements of FIG. 22 may be implemented by the processors 102 and 202 and/or the transceivers 106 and 206 of FIG. 21. For example, blocks 1010 to 1060 may be implemented by the processors 102 and 202 of FIG. 21. Alternatively, the blocks 1010 to 1050 may be implemented by the processors 102 and 202 of FIG. 21 and the block 1060 may be implemented by the transceivers 106 and 206 of FIG. 21.

Codewords may be converted into radio signals via the signal processing circuit 1000 of FIG. 22. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 22. For example, the wireless devices (e.g., 100 and 200 of FIG. 21) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 23:
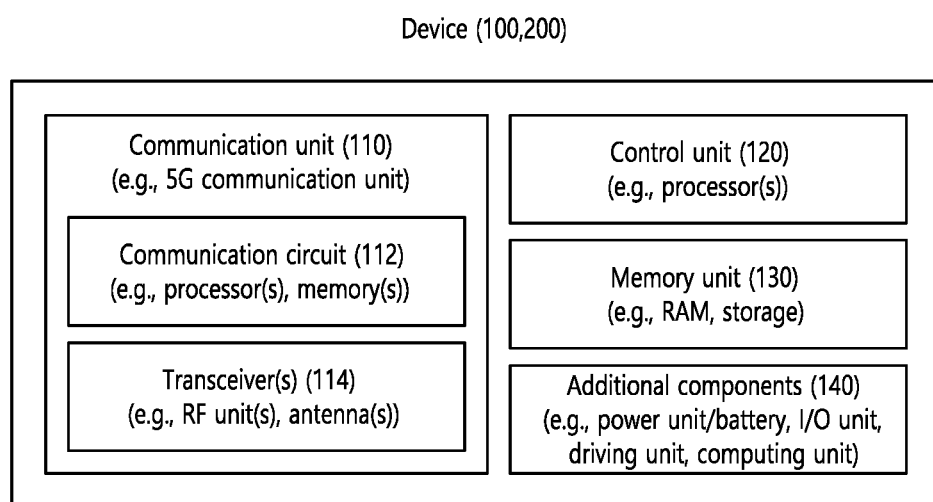
FIG. 23 shows another example of a wireless device, based on an embodiment of the present disclosure.

FIG. 23 shows another example of a wireless device, based on an embodiment of the present disclosure. The wireless device may be implemented in various forms according to a use-case/service (refer to FIG. 20).

Referring to FIG. 23, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 20), the vehicles (100b-1 and 100b-2 of FIG. 20), the XR device (100c of FIG. 20), the hand-held device (100d of FIG. 20), the home appliance (100e of FIG. 20), the IoT device (100f of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 23 will be described in detail with reference to the drawings.

Figure 24:
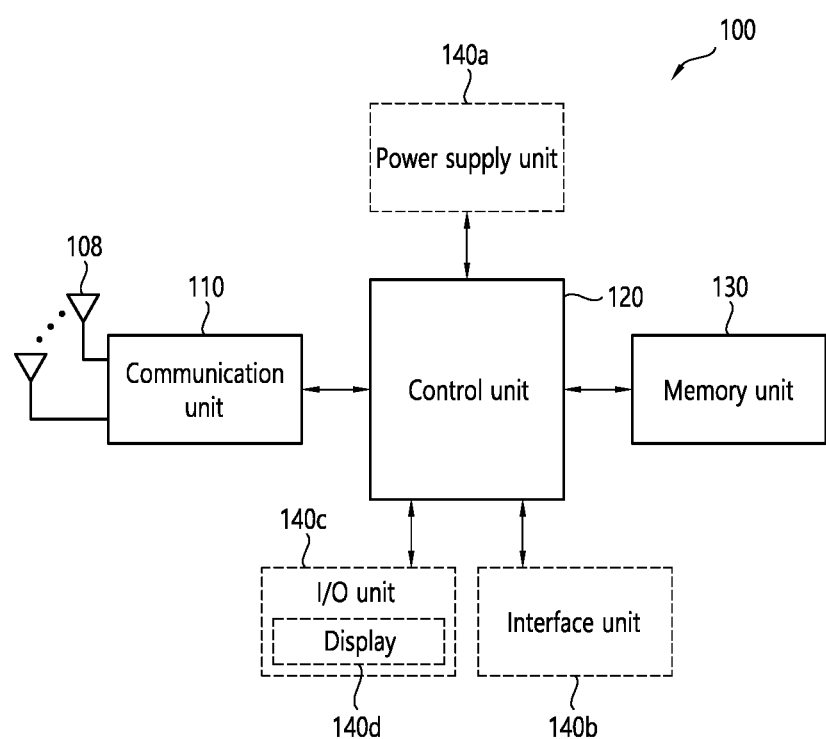
FIG. 24 shows a hand-held device, based on an embodiment of the present disclosure.

FIG. 24 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 24, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 25:
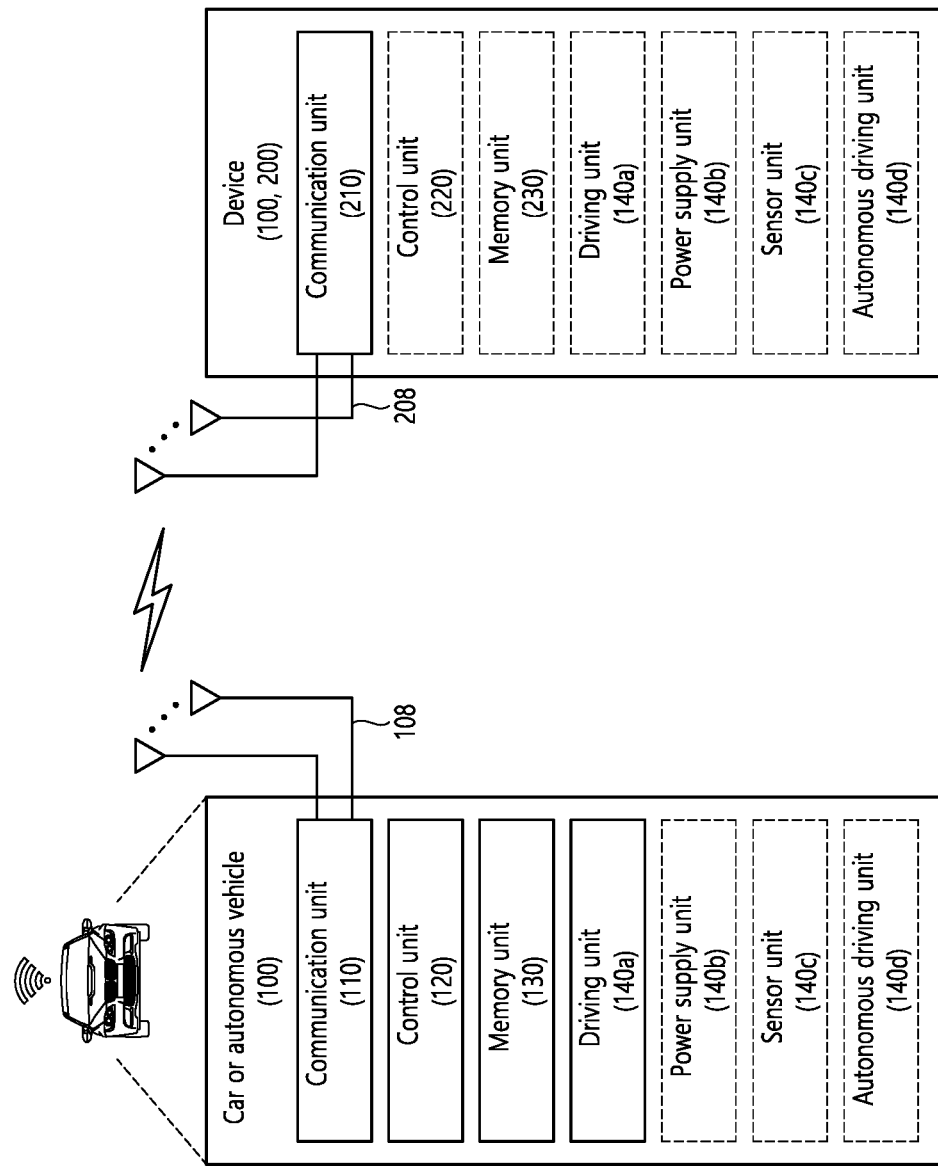
FIG. 25 shows a vehicle or an autonomous vehicle, based on an embodiment of the present disclosure.

FIG. 25 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 25, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 23, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, a first device, wireless communication, the method comprising:
    transmitting, to a second device, first sidelink control information (SCI) for scheduling of a first physical sidelink shared channel (PSSCH) and second SCI, through a physical sidelink control channel (PSCCH);
    transmitting, to the second device, the second SCI including information related to a channel state information (CSI) request through the first PSSCH; and
    receiving, from the second device, a medium access control (MAC) control element (CE) including a CSI report related to the CSI request, based on an active time related to a sidelink (SL) discontinuous reception (DRX),
    wherein the active time includes time from a transmission time point of the second SCI to a reception time point of the MAC CE.

2. The method of claim 1, wherein a length of the active time is equal to latency budget related to the CSI report.

3. The method of claim 1, wherein the MAC CE is transmitted from the second device based on a first timer, which is started based on the second device receiving the second SCI, running.

4. The method of claim 3, wherein an operation duration of the first timer is equal to latency budget related to the CSI report.

5. The method of claim 3, wherein the first timer is expired based on the second device transmitting the MAC CE.

6. The method of claim 1, further comprising:
    starting a first timer based on a reception of a second PSSCH including sidelink data,
    wherein the MAC CE is received while being included in the second PSSCH.

7. The method of claim 6, wherein the first timer is an inactivity timer, based on the second PSSCH being an initially transmitted message, and
    wherein the first timer is a retransmission timer, based on the second PSSCH being a retransmitted message.

8. The method of claim 1, wherein the active time is expired based on the reception of the MAC CE.

9. The method of claim 1, wherein the first device is in active state within the active time, and
    wherein sidelink communication related to the first device is performed based on the first device being in active state.

10. The method of claim 1, wherein the active time is time in which a first timer is running, and
    wherein the first timer is one among an on-duration timer, an inactivity timer, a hybrid automatic repeat request (HARM) round trip time (RTT) timer, and a retransmission timer.

11. The method of claim 1, wherein the MAC CE is transmitted from the second device, based on the second device being in active state.

12. The method of claim 1, wherein the MAC CE is received based on receptions of a plurality of PSSCHs, and
    wherein the plurality of PSSCHs are received based on a plurality of SCIs.

13. The method of claim 12, further comprising:
    starting a first timer based on a reception of at least one of the plurality of PSSCHs,
    wherein the first timer runs for a specific time value.

14. A first device for performing wireless communication, the first device comprising:
    one or more memories storing instructions;
    one or more transceivers; and
    one or more processors connected to the one or more memories and the one or more transceivers, wherein the one or more processors execute the instructions to:
    transmit, to a second device, first sidelink control information (SCI) for scheduling of a first physical sidelink shared channel (PSSCH) and second SCI, through a physical sidelink control channel (PSCCH);
    transmit, to the second device, the second SCI including information related to a channel state information (CSI) request through the first PSSCH; and
    receive, from the second device, a medium access control (MAC) control element (CE) including a CSI report related to the CSI request, based on an active time related to a sidelink (SL) discontinuous reception (DRX),
    wherein the active time includes time from a transmission time point of the second SCI to a reception time point of the MAC CE.

15. A device adapted to control a first user equipment (UE), the device comprising:
    one or more processors; and
    one or more memories operably connectable to the one or more processors and storing instructions, wherein the one or more processors execute the instructions to:
    transmit, to a second UE, first sidelink control information (SCI) for scheduling of a first physical sidelink shared channel (PSSCH) and second SCI, through a physical sidelink control channel (PSCCH);

transmit, to the second UE, the second SCI including information related to a channel state information (CSI) request through the first PSSCH; and receive, from the second UE, a medium access control (MAC) control element (CE) including a CSI report related to the CSI request, based on an active time related to a sidelink (SL) discontinuous reception (DRX), wherein the active time includes time from a transmission time point of the second SCI to a reception time point of the MAC CE.

\* \* \* \* \*